US012325032B2

(12) United States Patent
Mohanarangam et al.

(10) Patent No.: US 12,325,032 B2
(45) Date of Patent: Jun. 10, 2025

(54) INTERFACE DETECTION DEVICE AND SYSTEM FOR DISPERSED MULTI-PHASE FLUIDS

(71) Applicant: Commonwealth Scientific and Industrial Research Organisation, Acton (AU)

(72) Inventors: Krishna Mohanarangam, Acton (AU); Wei Yang, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 1131 days.

(21) Appl. No.: 16/346,789

(22) PCT Filed: Nov. 3, 2017

(86) PCT No.: PCT/AU2017/051212
§ 371 (c)(1),
(2) Date: May 1, 2019

(87) PCT Pub. No.: WO2018/081867
PCT Pub. Date: May 11, 2018

(65) Prior Publication Data
US 2019/0275535 A1  Sep. 12, 2019

(30) Foreign Application Priority Data
Nov. 4, 2016 (AU) .................................. 2016904518

(51) Int. Cl.
*B03D 1/02* (2006.01)
*G01F 23/24* (2006.01)
*G01F 23/26* (2022.01)

(52) U.S. Cl.
CPC ........... *B03D 1/028* (2013.01); *G01F 23/242* (2013.01); *G01F 23/245* (2013.01); *G01F 23/261* (2013.01)

(58) Field of Classification Search
CPC ......... B03D 1/028; B03D 1/02; G01F 23/242; G01F 23/245; G01F 23/261
(Continued)

(56) References Cited

U.S. PATENT DOCUMENTS 4,059,016 A * 11/1977 Kitzinger .............. G01F 23/243
73/304 R
5,094,112 A 3/1992 Hoefelmayr et al.
(Continued)

OTHER PUBLICATIONS

Bolton, Gary, et al., "A Novel Electrical Tomography Sensor for Monitoring the Phase Distribution in Industrial Reactors," Seventh UK Conference on Mixing, Bradford, UK, 2002, retrieved from the Internet on January 9, 2018, <URL: https://www.researchgate.net/profile/Gary_Bolton3/publication/299344654_A_NOVEL_ELECTRICAL_TOMOGRAPHY_SENSOR_FOR_MONITORING_THE_PHASE_DISTRIBUTION_IN_INDUSTRIAL_REACTORS/links/56f15b5e08aed354e56fb3fa.pdf>.
(Continued)

*Primary Examiner* — Peter Keyworth
(74) *Attorney, Agent, or Firm* — Crowell & Moring LLP

(57) ABSTRACT

Embodiments generally relate to froth measurement apparatus, and related methods and systems. An example apparatus comprises: an elongate first housing portion; and a series of sensor probes positioned along the first housing portion, each of the sensor probes having a probe body extending away from the first housing portion by a distance and comprising first and second electrodes for measuring changes in electrical potential associated with froth and/or bubbles. The sensor probes comprise signal processing circuitry coupled to the probe bodies to receive analog
(Continued)

output signals from the probe bodies and to generate digital output signals based on the analog output signals. The apparatus comprises at least one processor configured to receive the digital output signals or sensor information based on the digital output signals and configured to determine at least one froth parameter over a sampling period based on the digital output signals or the sensor information.

22 Claims, 21 Drawing Sheets

(58) Field of Classification Search
USPC ............................... 209/164, 166, 168, 170
See application file for complete search history.

(56) References Cited

U.S. PATENT DOCUMENTS

| | | | |
|---|---|---|---|
| 8,008,931 B2* | 8/2011 | Parvinen | B03D 1/028 |
| | | | 324/693 |
| 2013/0258319 A1 | 10/2013 | Schleicher et al. | |
| 2013/0298646 A1 | 11/2013 | Ohl et al. | |
| 2014/0151273 A1 | 6/2014 | Lehikoinen et al. | |
| 2014/0184247 A1* | 7/2014 | Tran | G10K 13/00 |
| | | | 324/663 |

OTHER PUBLICATIONS

International Search Report for corresponding international application No. PCT/AU2017/051212, mailed Jan. 15, 2018.
Nissinen, Antti, et al. "Estimation of the bubble size and bubble loading in a flotation froth using electrical resistance tomography", Minerals Engineering, vol. 69, 2014, Abstract.
Schleicher, Eckhard, et al., "New Developments in Fast Needle Probe Sensors for Multiphase Flow Measurements," Institute of Safety Research, 2015, pp. 45-52, retrieved from the Internet on Jan. 9, 2018,<URL: http://www.hzdr.de/FWS/pulikat/JD05/JB_05_R07.pdf>.
Written Opinion of the International Searching Authority for corresponding international application No. PCT/AU2017/051212, mailed Jan. 15, 2018.
Nissinen, Antti, et al., "Estimation of the bubble size and bubble Ioding in a flotation froth using electrical resistance tomography", Minerals Engineering, vol. 69, 2014.

* cited by examiner

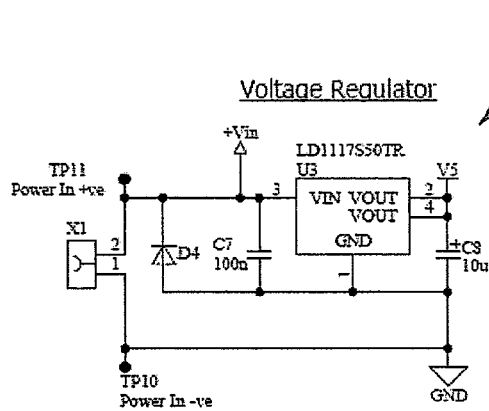
Fig. 15
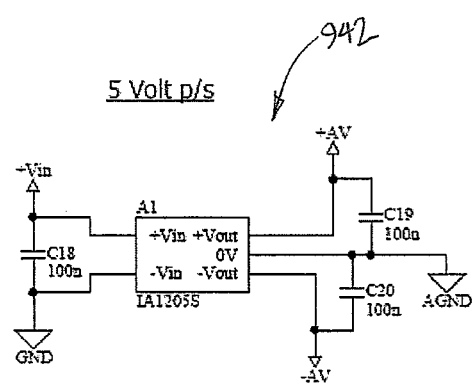
Fig. 16
Fig. 17
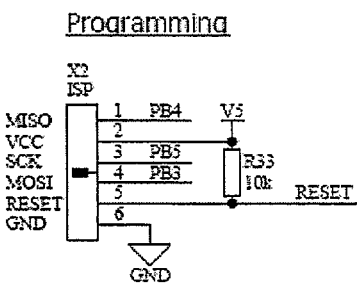
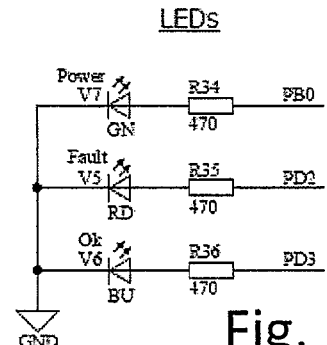
Fig. 18
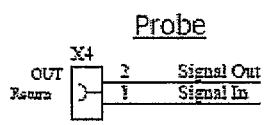
Fig. 19
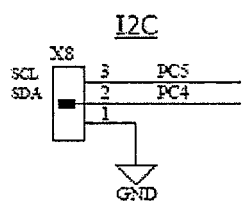
Fig. 20
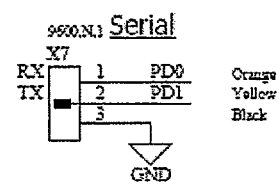
Fig. 21
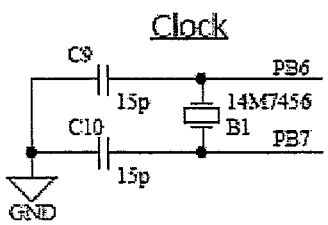
Fig. 22

220

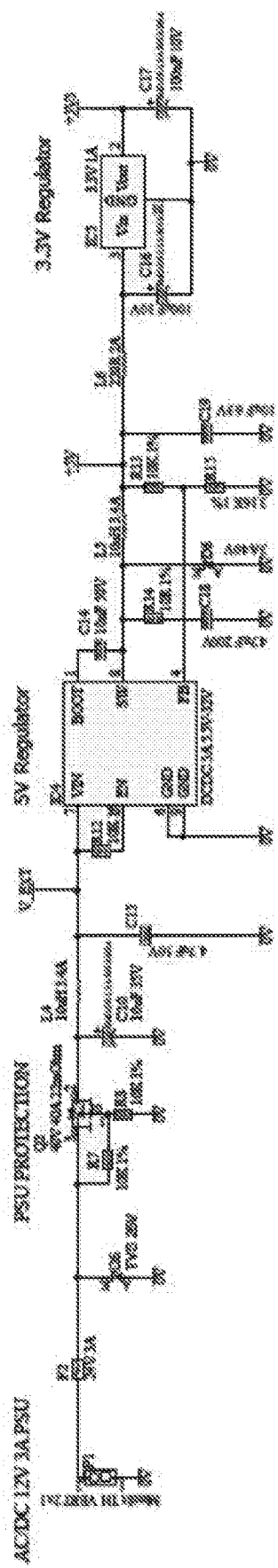
Fig. 44
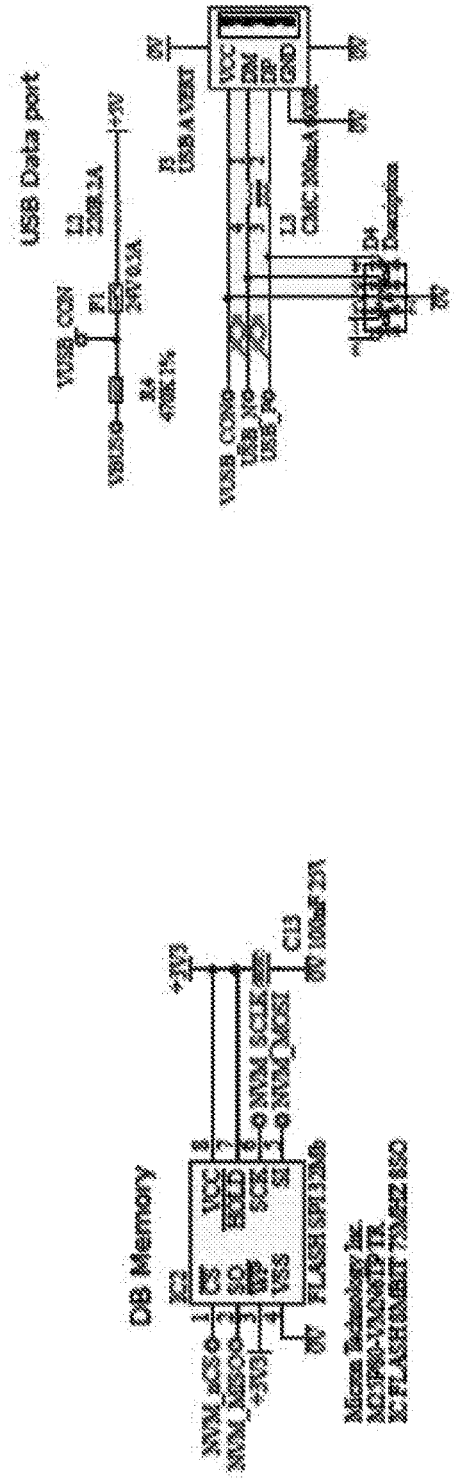
Fig. 46
Fig. 45

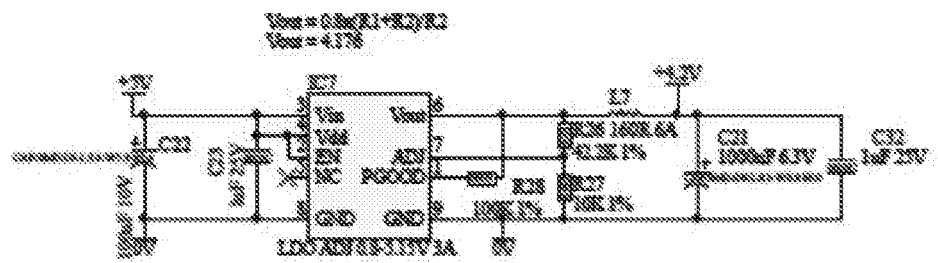
Fig. 48
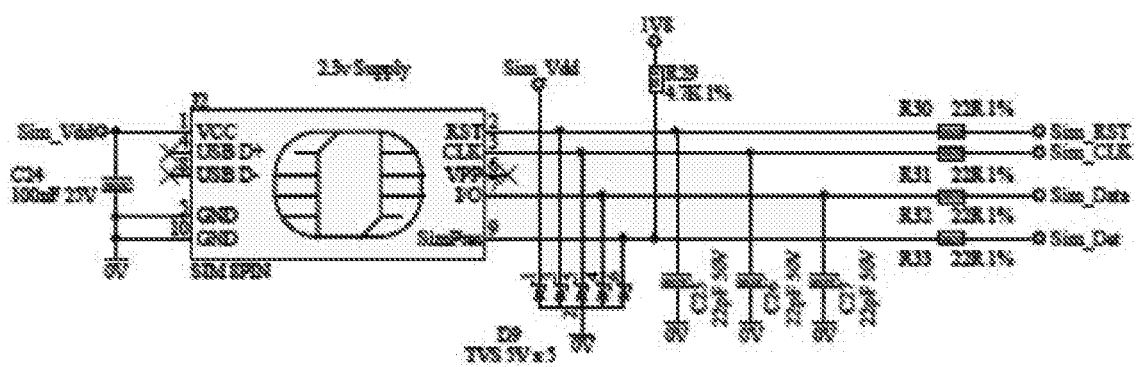
Fig. 50
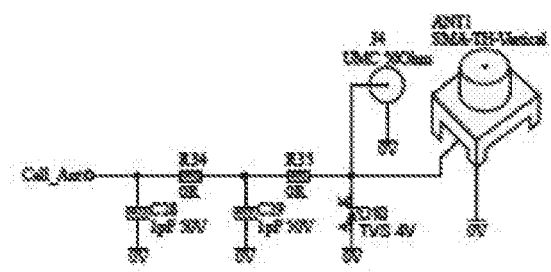
Fig. 51
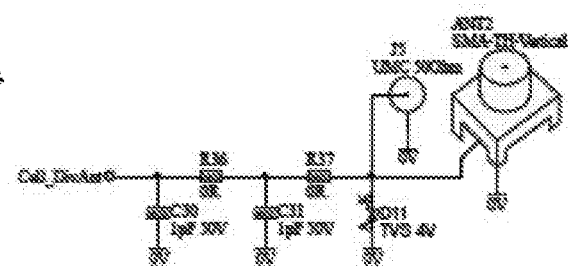

INTERFACE DETECTION DEVICE AND SYSTEM FOR DISPERSED MULTI-PHASE FLUIDS

CROSS-REFERENCE TO RELATED APPLICATIONS

The present application is the U.S. National Stage application of PCT Application No. PCT/AU2017/051212, filed on Nov. 3, 2017, titled Interface Detection Device and System for Dispersed Multi-phase Fluids, designating the United States, which claims priority from Australian Patent Application No 2016904518 filed on Nov. 4, 2016 the content of which is incorporated herein by reference.

TECHNICAL FIELD

Embodiments generally relate to interface detection devices, systems and methods for dispersed multi-phase fluids. Embodiments may be applied to froth level detection in flotation cells in mineral processing plants, for example.

BACKGROUND

In multi-phase mineral processing plants, there may be flotation cells designed to perform mineral separation by the generation of bubbles through a liquid bath, resulting in the creation of froth at the top of the liquid bath. In such systems, the froth is intended to carry with it the desired mineral as the froth is progressively removed from the top of the flotation cell.

Different process parameters can affect bubble generation in the liquid bath, as well as the depth of the froth layer at the top of the flotation cell, which can affect the efficiency of the mineral capture from the separation process. In order to improve mineral capture efficiency, it can be desirable to be able to modify certain process parameters, such as how much air is supplied to the flotation cell and how much reagent to add to the flotation cell to assist in the froth generation. Current feedback mechanisms or systems for modifying such process parameters are limited in accuracy and/or range of measurements.

It is desired to address or ameliorate one or more shortcomings or disadvantages associated with prior techniques for interface detection in dispersed multi-phase fluids, or to at least provide a useful alternative to such techniques.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a froth measurement apparatus, comprising:
an elongate first housing portion;
a series of sensor probes positioned along the first housing portion, each of the sensor probes having a probe body extending away from the first housing portion by a distance and comprising first and second electrodes for measuring changes in electrical potential associated with froth and/or bubbles, the first and second electrodes being electrically insulated from each other, wherein a first sensing surface at a distal end of the first electrode is spaced from a second sensing surface at a distal end of the second electrode, wherein the sensor probes comprise signal processing circuitry coupled to the probe bodies to receive analog output signals from the probe bodies and to generate digital output signals based on the analog output signals; and at least one processor configured to receive the digital output signals or sensor information based on the digital output signals and configured to determine at least one froth parameter over a sampling period based on the digital output signals or the sensor information.

The at least one froth parameter may comprise bubble size and/or bubble quantity. The probe bodies may extend away from the housing by a distance of about 10 mm to about 100 mm. The distance may be about 30 mm to about 70 mm, optionally about 40 mm to about 60 mm, optionally about 50 mm.

The first housing portion may be elongate in a vertical direction and houses the signal processing circuitry in a sealed chamber.

The first and second electrodes may be co-axial along a longitudinal axis of the sensor probe. The first and second electrodes may be concentric. The first and second electrodes may be separated by an insulating material that is concentric with the first and second electrodes.

The signal processing circuitry may comprise an ADC unit to generate digital output signals based on analog output signals from the respective probe body. Each of the ADC units may be housed within the first housing portion. The at least one processor may be disposed outside of the first housing portion.

The apparatus may further comprise a second housing portion that is separate from the first housing portion and that houses the at least one processor.

Each of the probe bodies may extend downwardly at an acute angle to the horizontal.

The apparatus may further comprise electromagnetic shielding to shield the signal processing circuitry from environmental signal interference.

The series of sensor probes may be arranged in a substantially linear array. The linear array of sensor probes may comprise a staggered linear array.

The first housing portion may be disposed in a flotation cell chamber to measure froth during operation of a flotation cell.

The at least one processor may be configured to generate a process command based on the determined bubble size and bubble quantity and to communicate the process command to process equipment associated with the flotation cell to alter a process input to the flotation cell.

Some embodiments relate to a system comprising the froth measurement apparatus described above, and further comprising a computing system in communication with the at least one processor to monitor an output of the froth measurement apparatus. Some embodiments relate to a method of monitoring a process using a sensor array, where the sensor array comprises a series of sensor probes positioned along a first housing portion and extending away from the first housing portion by a distance, each of the sensor probes having a probe body comprising first and second electrodes for measuring changes in electrical potential associated with froth and/or bubbles, the first and second electrodes being electrically insulated from each other, wherein a first sensing surface at a distal end of the first electrode is spaced from a second sensing surface at a distal end of the second electrode, wherein the sensor probes comprise signal processing circuitry coupled to the probe bodies to receive analog output signals from the probe bodies and to generate digital output signals based on the analog output signals.

The signal processing circuitry may comprise a current to voltage converter for converting the analogue output signal from the probe body to a signal suitable as input to a precision rectifier circuit. The current to voltage converter may comprise a variable resistor that can be controlled by the processer in order to scale the analog output signals from the probe body.

The signal processing circuitry may be configured to switch between a conductivity-sensing mode and a capacitance-sensing mode based on the digital output signals or the sensor information. The signal processing circuitry of each sensor probe may comprise a sensor processor to control processing of the received analog signals and communicate with the at least one processor.

Some embodiments relate to a method of monitoring a process using any of the apparatus or systems described above, the method comprising:
determining the at least one froth parameter;
determining a modified process parameter based on the at least one froth parameter; and
applying the modified process parameter to the process.

BRIEF DESCRIPTION OF DRAWINGS

Embodiments are described in further detail below, by way of example, with reference to the accompanying drawings, in which:

FIG. 15 is a schematic electrical circuit diagram of a voltage regulator;

FIG. 16 is a schematic electrical circuit diagram of a power supply;

FIG. 17 is a schematic electrical circuit diagram of a programming interface;

FIG. 18 is a schematic electrical circuit diagram of a light emitting diode (LED) circuit;

FIG. 19 is a schematic electrical diagram of the probe body;

FIG. 20 is a schematic electrical diagram of an I2C bus interface;

FIG. 21 is a schematic electrical diagram of a serial communication interface;

FIG. 22 is a schematic electrical circuit diagram of a clock circuit;

FIG. 44 is a schematic circuit diagram of a voltage regulator;

FIG. 45 is a schematic circuit diagram of a memory module;

FIG. 46 is a schematic circuit diagram of a USB data port connector; and

FIGS. 47 to 51 are schematic circuit connection diagrams of circuitry components of a wireless communications subsystem.

DETAILED DESCRIPTION

Embodiments generally relate to interface detection devices, systems and methods for dispersed multi-phase fluids. Embodiments may be applied to froth level detection in flotation cells in mineral processing plants, for example.

Figure 1:
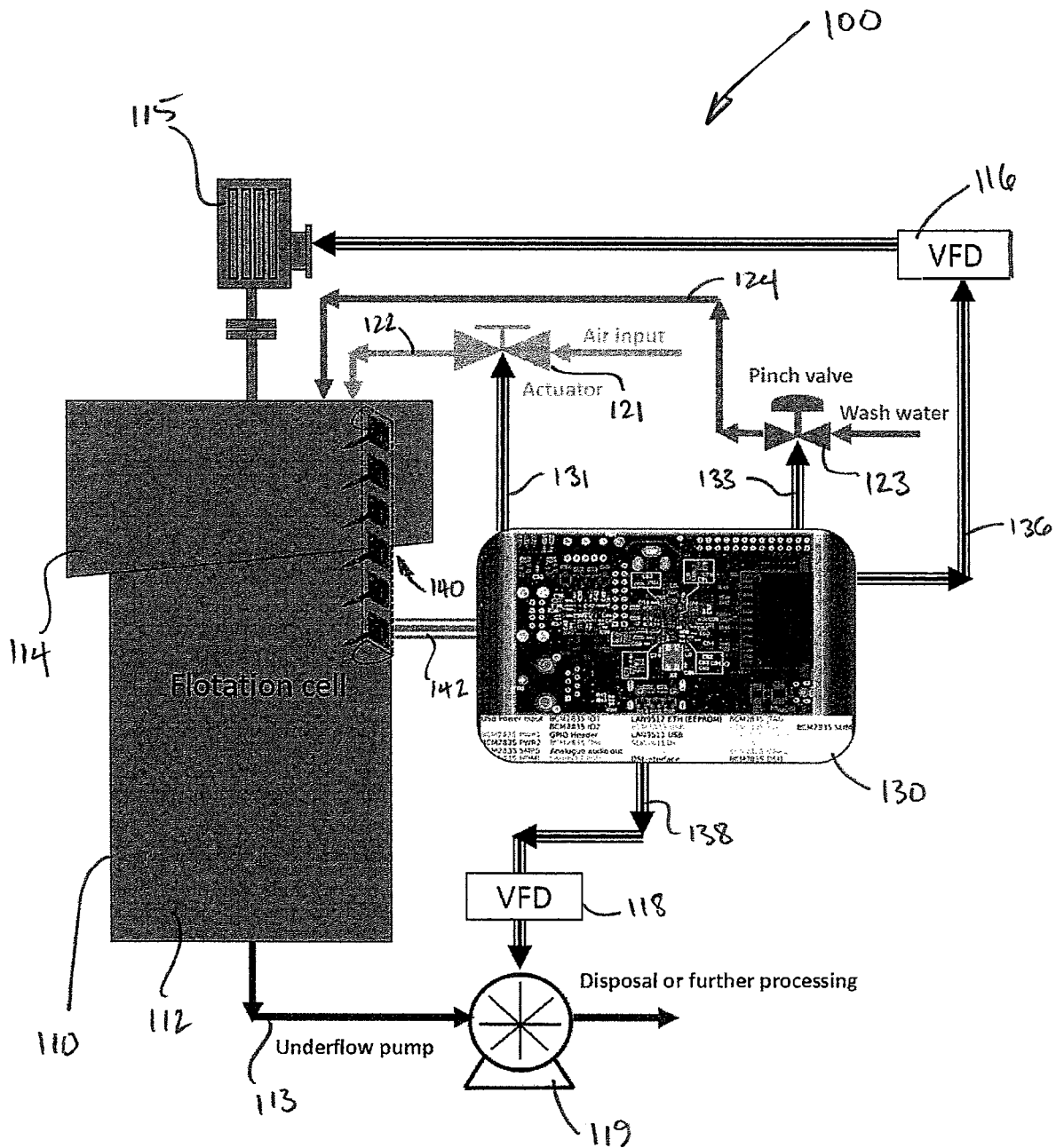
FIG. 1 is a schematic diagram of system for interface detection of multi-phase fluids in a flotation cell.

Referring now to FIG. 1, a mineral processing system 100 is shown. Mineral processing system 100 comprises a flotation cell 110 arranged to receive an ore slurry containing fine minerals in low concentration. For example, flotation cells such as 110 can be used as part of a process to extract high value minerals within a bulk material. Such high value minerals may include gold, or copper, for example. For gold, the mineral concentration may be in the order of 1 g per 1000 kg, for example. For copper, the concentration may be in the order of 3 g per 1000 kg, for example. In mineral processing of high value, low concentration minerals, the efficiency of the flotation cell in extracting the mineral from the input slurry can have a significant impact on the production yield and therefore economic viability of the mineral processing.

System 100 comprises further plant equipment to support operation of the flotation cell, such as an agitator 115 driven by a variable frequency drive (VFD) 116 and an underflow pump 119 to extract liquids and/or solids from a base of the flotation cell via a suitable drainage conduit 113. The pump 119 is driven by VFD 118. Further, system 100 includes an air supply via an air supply conduit 122 and a wash water supply via a water supply conduit 124, both of which feed into the flotation cell. Control of the air supply is effected by an actuator 121, while control of the wash water supply is effected by a valve 123. System 100 may comprise further processing plant upstream or downstream of the flotation cell 110, although this is not shown or described in order to avoid obscuring the features of the present disclosure.

System 100 further comprises at least one computerised processor or processing system or device or a combination of such processing components, described herein for simplicity as processor 130. Processor 130 is arranged to provide control outputs to various equipment within system 100. For example, processor 130 provides a control output 136 to VFD 116 to drive agitator 115 at an appropriate speed, which in turn causes rotation of an impeller or other agitation means within the liquid chamber 112 of the flotation cell 110. Further, processor 130 provides a control output 138 to the VFD 118 to drive the pump 119 as necessary. Processor 130 further supplies a control output 133 to the valve 123 in order to selectively introduce further wash water into the flotation cell 110 via supply conduit 124. Additionally, processor 130 provides a control output 131 to the air supply actuator 121 to selectively introduce further air via air supply conduit 122 into the liquid bath of the flotation cell 110. Processor 130 may act as, or comprise part of, a main control unit to control operation of various parts of system 100, including those described above.

System 100 further comprises a sensor array 140 arranged within the flotation cell 110 and positioned to extend across a range of depths that include expected liquid levels, expected froth levels and expected levels of transition between pulp (liquid) and froth. The sensor array 140 is in communication with processor 130, for example via a bus cable 142 or other suitable communication means.

As shown in FIG. 1, the flotation cell 110 may include a large cylindrical container defining a liquid chamber 112 within which the agitator 115 drives the impeller. At a top of the chamber 112 is a froth outlet 114 to allow mineral captured in the froth to be drawn off the top of the liquid bath in the flotation cell. The position of the sensor array 140 is preferably spaced from the froth outlet 114, for example, positioned on a side wall of the flotation cell that is generally opposite or facing, or at least substantially spaced from, the froth outlet 114. In some embodiments, the sensor array 140 may be suspended from a gantry above the flotation cell in order to extend downwardly to depths where froth and liquid levels are expected to provide sensor measurements of interest.

Figure 2:
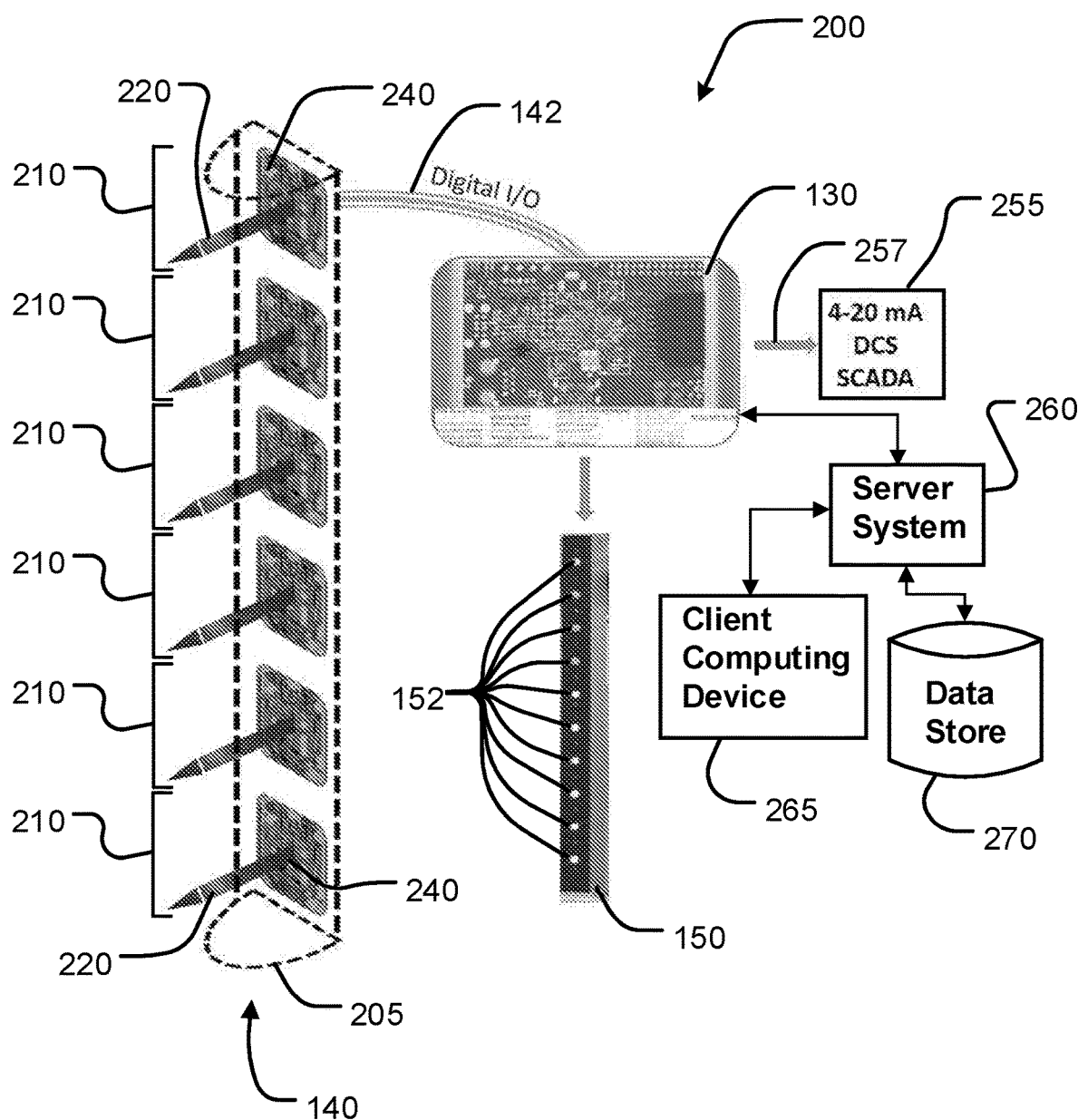
FIG. 2 is a schematic illustration of a probe array and processor of the system in FIG. 1.

Referring now to FIG. 2, the sensor array 140 is described in further detail as part of a sensor system 200 that also includes processor 130. Sensor system 200 also includes a status display 150 responsive to display signals from processor 130 to indicate via LEDs 152 a sensor status of each of the sensor probes 210 in the sensor array 140. The LEDs 152 may be configured as three-colour LEDs to indicate one of three statuses: air detection, froth detection or pulp (liquid) detection. The status display may be provided on a separate housing to housing 205 or housing 208 (FIG. 3). The separate housing for status display 150 may be located outside of the flotation cell 110, such as on an outside wall of the flotation cell 110 or on a nearby mounting surface, so that an operator can view the status display to readily gauge the depth of the froth layer in comparison to the top of the flotation cell and the liquid (pulp) level.

In wall-mounted embodiments, the housing 205 may be retro-fitted to a tank wall of the flotation cell 110 or may be in-built or integrally formed therewith and disposed at an upper part of the tank wall where a top sensor probe 210 can detect air above the froth or the froth height above the lip of the flotation cell 110.

According to various embodiments, the housing 205 is sufficiently elongate and houses a sufficient number of sensor probes 210, such as 20 to 25 sensor probes, for example, to vertically span an area somewhat greater (e.g. 10%, 20%, 30%, 40% or 50% greater) than the expected vertical extent of the transition regions between pulp, froth and air for a given flotation cell 110.

Processor 130 in system 200 is configured to communicate via a wired or wireless communication link 257 to a distributed control system 255, which may be referred to as a SCADA system. DCS 255 may act as an interface to other process equipment within the mineral processing facility, such as computer equipment and/or other control or monitoring equipment, for example.

Processor 130 may have a wireless communication subsystem and may support wired communication using standard protocols. The wireless communication and subsystem may include a short range, local area transceiver for local area network (LAN) communications and may also include an antenna suited for mobile data communication of a longer range, for example using a GSM mobile connection or other wireless data connection relying on a subscriber identity module (SIM) card housed within a housing 208 portion that houses processor 130. Processor 130 thus comprises computer processing components such as a CPU, microprocessor and/or micro controller, together with suitable stored program code in program memory and operational data stored in data memory, plus a power supply to enable appropriate computing and control functionality as described herein.

In particular, processor 130 may be configured to communicate either wired or wirelessly with a server system 260 in order to facilitate data storage or retrieval from a data store 270 accessible to the server system 260. Further, server system 260 may be employed in order to provide data processing capabilities not provided by the processor 130. Server system 260 may further provide a user interface for access by a client computing device 265 so that plant operators can access information derived from sensor measurements obtained via sensor array 140. Additionally, client computing device 265 may access the user interface provided by server system 260 to enable plant operators to set performance parameters of system 200, including setting sensor data acquisition parameters separately and/or differently for each of the sensor probes 210 in the sensor array 140.

The processor 130, in combination with the server system 260 and/or the DCS 255, may be configured for monitoring and/or controlling a flotation process using the apparatus or systems described herein. The process monitoring may include performance by the processor 130, server system 260 and/or DCS 255 of a method comprising: determining at least one relevant froth parameter during operation of the flotation cell; determining a modified process parameter based on the at least one froth parameter; and applying the modified process parameter to various plant associated with the flotation cell to modify the process and/or modify operation of the flotation cell.

The sensor array 140 comprises a housing 205, such as a sealed elongated housing body to house at least a part of each sensor probe 210, so that probe circuitry 240 is within the housing 205 while at least a part of a probe body 220 extends outwardly from a wall of the housing 205. The probe body 220 projects outwardly and away from the housing wall in order to be able to take resistivity readings resulting from passage of liquid and/or air (including bubbles) across the respective tips of each of the probe bodies 220.

Figures 3A, 3B, 3C, 3D:
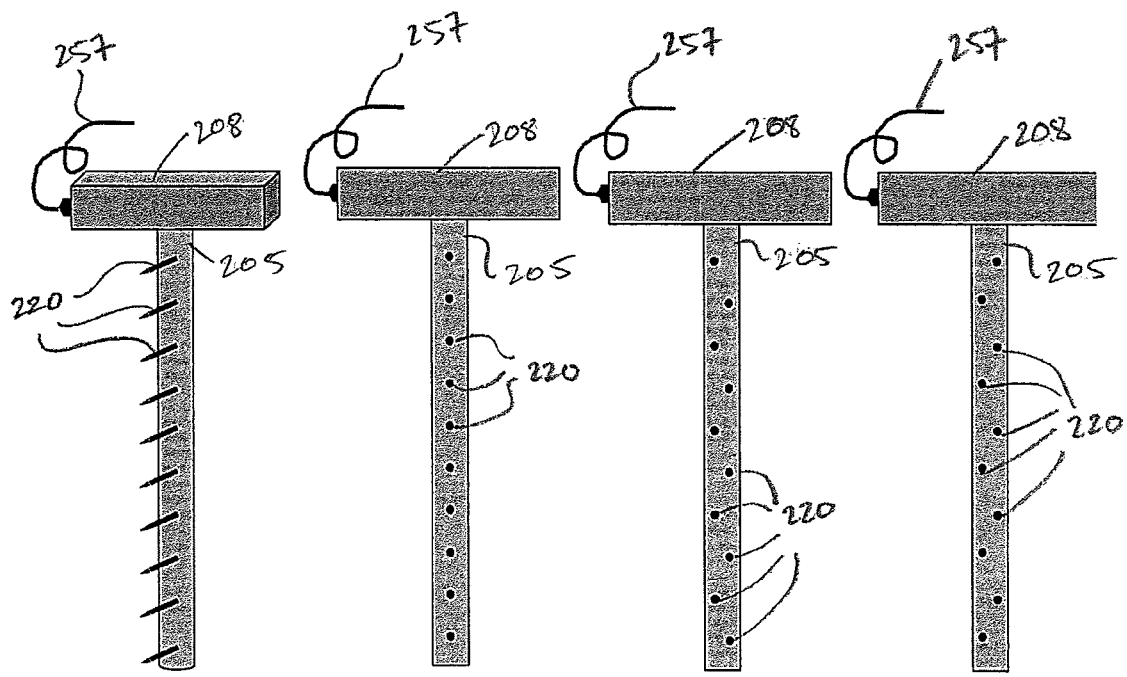
FIGS. 3A, 3B, 3C and 3D are schematic representations of probe array embodiments.

Referring also to FIGS. 3A, 3B, 3C and 3D, there are shown example configurations of the probe bodies 220, housing 205 (which comprises first housing portion) and a second housing portion 208 that houses the processor 130. FIGS. 3A-3D also indicate a communication cable as the communication means 257 to an external system such as DCS 255. As illustrated in FIG. 3B, each of the sensor bodies (seen end-on in FIG. 3B) projects away from the housing 205 by a certain distance. This distance may be configured for a particular sensor array, depending on the desired operational configuration for the sensor array 140. However, the distance of projection of each of the sensor bodies 220 from the housing 205 may be in the range of about 10 mm to about 100 mm, in some embodiments around 30 mm to around 70 mm, in some embodiments around 40 mm to around 60 mm and in some embodiments around 50 mm.

The sensor array 140 may be configured as a straight linear array, such as is illustrated in FIG. 3B, with all of the sensor bodies 220, coinciding with a vertical line extending longitudinally down a substantial length of the vertically elongate housing 205. In alternative arrangements, such as are illustrated in FIGS. 3C and 3D, the sensor array 140 may be arranged as a generally linear array where the sensor bodies 220 are staggered (i.e. offset from each other) but extending in a linear direction that is substantially vertical and extends across a substantial length of the housing 205. Thus, the staggered arrangement of the sensor bodies 220 is an approximate linear array or can be considered as offset lines of sensor array subsets.

As illustrated in FIG. 3A, the sensor bodies 220 may, in some of the embodiments, be angled slightly downward at an acute angle relative to the horizontal. The acute angle may be between about 45 and about 10 degrees, for example. This downward angle of the probe bodies 220 can be helpful for certain froths that might otherwise tend to foul or accumulate on the sensor bodies 220 where they are horizontally extending. The angling of the sensor bodies allows fluids from the flotation cell to flow downward and off the probe tip, which can thereby reduce the amount or likelihood of such fouling or substance accumulation on the sensor bodies 220.

Figure 4:
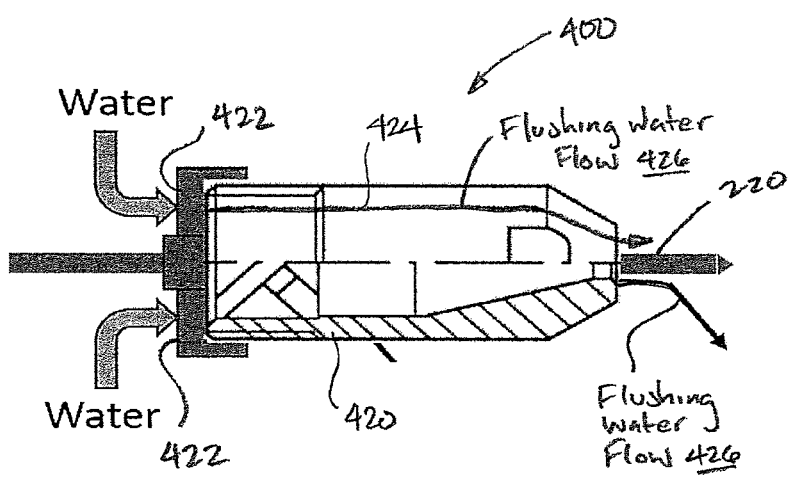
FIG. 4 is a schematic side view illustration of a flushing arrangement for use with one or more of the probes of the probe array.

As shown in FIG. 4, some embodiments of the sensor array 140 may employ a flushing mechanism 400 arranged about or adjacent the base (proximal end) of one or more of the probe bodies 220 and configured to flush water or cleansing fluids along the exposed length of the probe 220 in order to remove fouling or other substance accumulations that may occur on the probe 220 over time. The flushing mechanism 400 may be arranged about or adjacent the base of only those probe bodies that are likely to be above the liquid level of the liquid bath in the flotation cell most of the time during normal operation of the flotation cell (i.e. the probe bodies 220 of the top 3 to 6 probes 210). Alternatively, the flushing mechanism may be arranged about or adjacent the base of all of the probe bodies 220 in the sensor array 140. The flushing mechanism 400 may rely on a water supply (received through the housing 205) supplied through one or more inlets 422 in a base of a flushing module 420. The flushing module 420 defines at least one fluid flow path 424 through the flushing module 420 that allows liquid flow such as water flow 426 to be released or projected onto the probe body 220 (about or adjacent to which the flushing mechanism 400 is arranged) at a pressure sufficient to wash off or reduce accumulated substances thereon.

Referring now to FIGS. 5A to 5F and 6, some example probe bodies 220 are described in further detail. FIGS. 5A-5F each show probe body variations with slightly different tip configurations. Each of the probe bodies 220 has a core electrode 520 which may be formed as a cylindrical electrode having a sharpened pointed tip 525 at a distal end thereof. The central core electrode 521 acts as a first electrode and is surrounded by a sheath, layer or cylinder of insulating material 522, outside of which is disposed an outer conductor layer to act as a second electrode 523.

Figures 5A, 5B, 5C, 5D, 5E, 5F, 6:
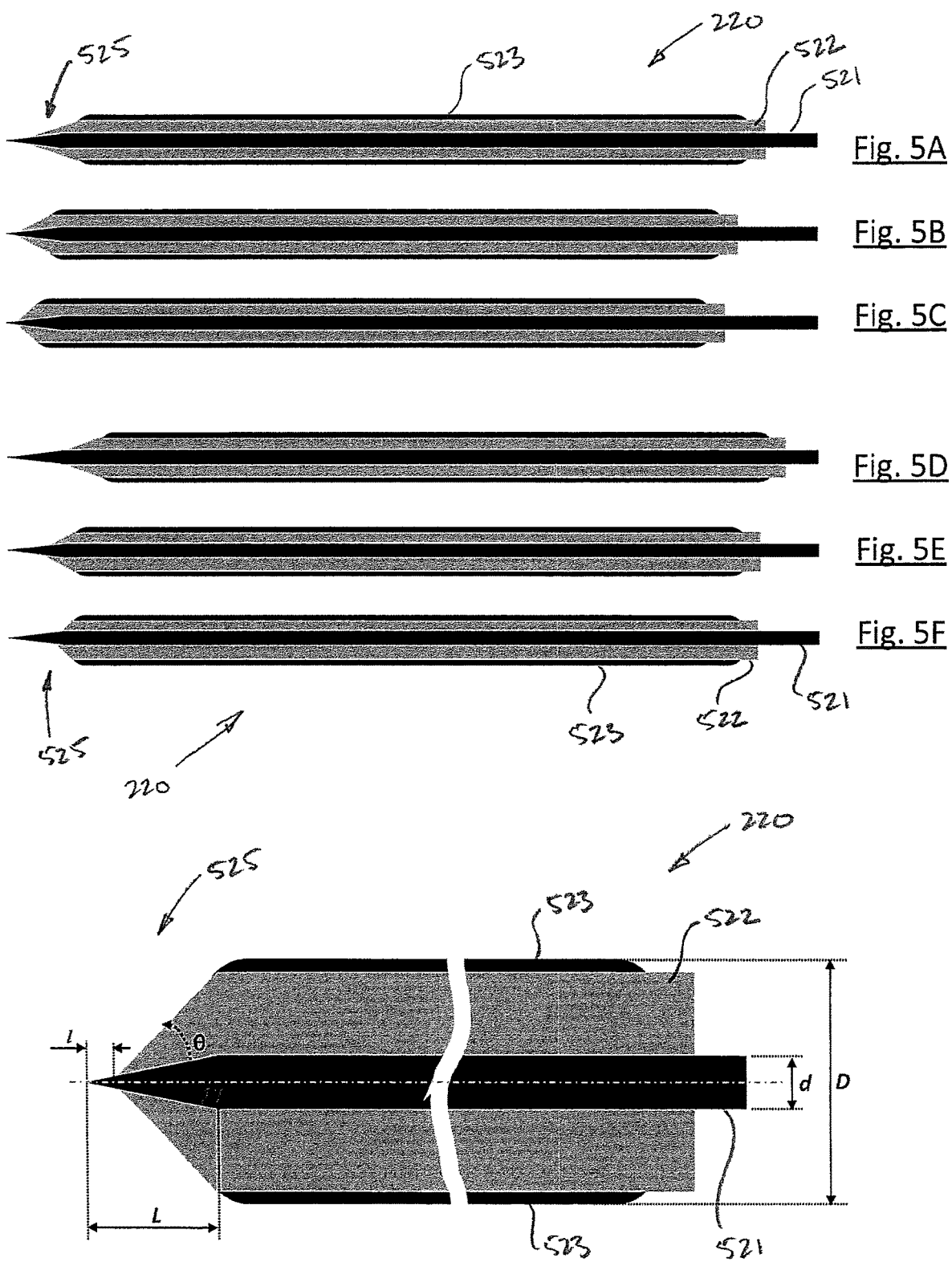
FIGS. 5A, 5B, 5C, 5D, 5E and 5F are various examples of probe tip configurations that can be used in the probes.
FIG. 6 is a close up view of an example probe tip configuration.

The optimum configuration of probe tip 525 may depend on the conditions under which the flotation cells are to be operated. However, as shown in FIG. 6, each probe body 520 has a portion at a distal end of the core electrode 521 that projects through and is not covered by the insulating sheath 522 at distal probe tip 525. At the tip 525, the insulating sheath 522 may extend between the distal end of the outer electrode 523 and the distal end of the core electrode 521 at an insulation tapering angle (defined by angle $\theta$ in FIG. 6). This angle can be configured to effectively vary the distance at tip 525 between the conductor surfaces of the inner and outer electrodes 521 and 523, which can affect the sensitivity of the sensor measurements, depending on bubble size or how fast froth bubbles move past the sensor tip 525. Additionally, the length, l, of the exposed area of the core electrode 521 extending past the insulating material 522 at the tip 525, can affect how much conductive surface area of the core electrode is exposed to fluid contact and thereby affect the proportion of exposed sensing surface area of the core electrode 521 compared to the exposed sensing surface area outer electrode 523, which can also affect measurement sensitivity for certain operating conditions.

As indicated in FIG. 6, the outer diameter, D, of the outer electrode 523 may be significantly (e.g. 5 to 15 times) greater than the diameter, d, of the core electrode 521. The tapering tip distance, L, of the core electrode 521 will generally be greater than (but possibly equal to) the exposed tip distance, l, that is not covered by the insulating material 522. The electrode tapering angle, $\gamma$, of the core electrode 521 will generally be slightly less than (but possibly equal or slightly greater than) the insulation tapering angle $\theta$.

Example dimensional ranges for the dimensions and angles referenced above include: L=1-10 mm, l=1-5 mm, θ=1-10°, γ=0.5-10°, D=3-15 mm, d=0.125-3 mm.

Figure 7:
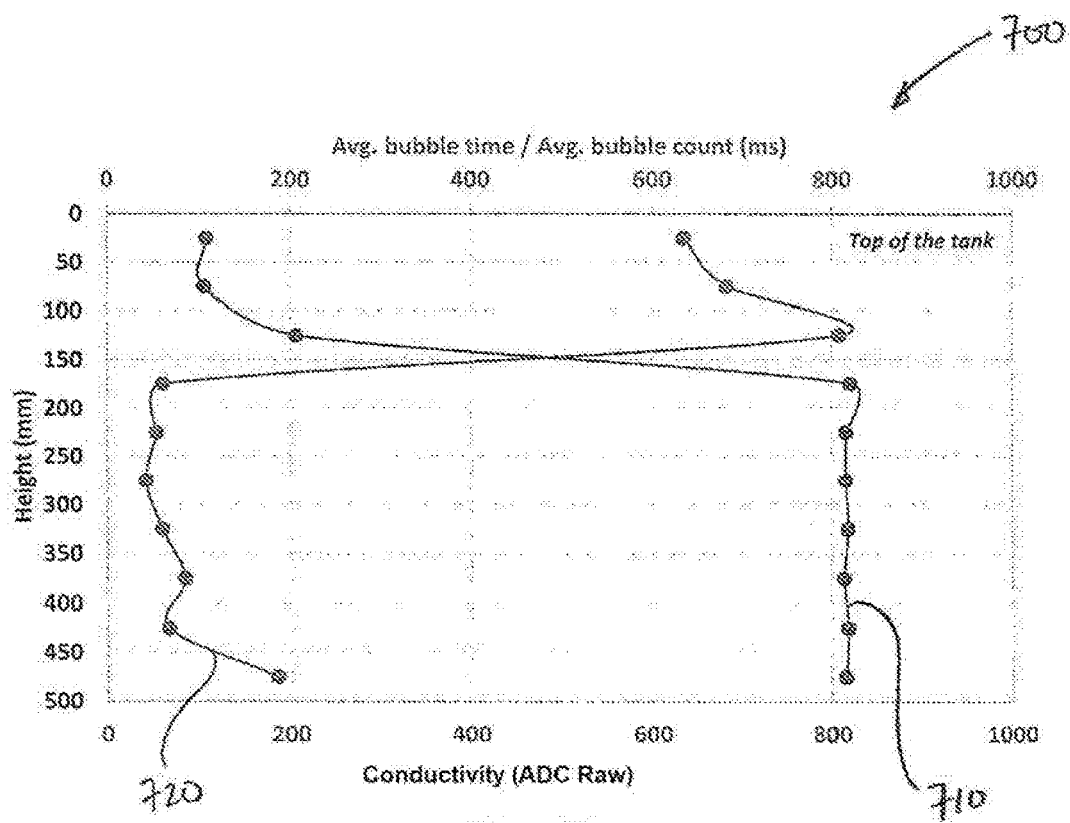
FIG. 7 is an example plot of flotation tank depth versus conductivity measured by the probe array and compared with average bubble time.

FIG. 7 is a plot of an example set of measurements of flotation cell depth (height) versus electrical conductivity (curve 710), as measured from the top of the flotation cell tank, against which is also plotted average bubble count in milliseconds (curve 720). In this example, each sensor probe is represented by a dot on the relevant curve, with each of these sensor probes being spaced at 50 mm intervals. It can be observed from FIG. 7 that the resistivity changes dramatically between 100 and 200 mm depths, indicating a transition from froth to pulp in that depth region. It can also be seen that the bubble count curve increases markedly between 100 and 150 mm of depth as compared to 0-100 mm, and then drops significantly past 150 mm of depth.

Figure 8A:
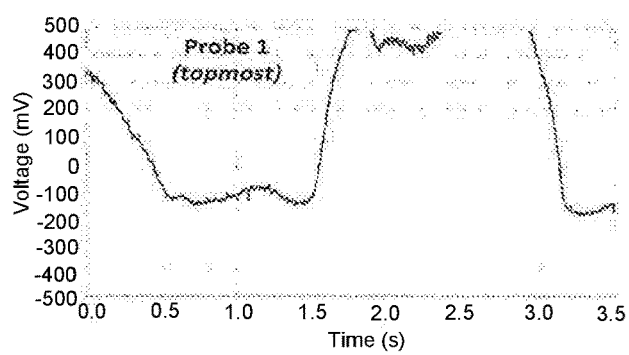
FIGS. 8A, 8B, 8C, 8D, 8E and 8F are example plots of voltage versus time for probe outputs of each of a number of probes of the probe array.
Figure 8B:
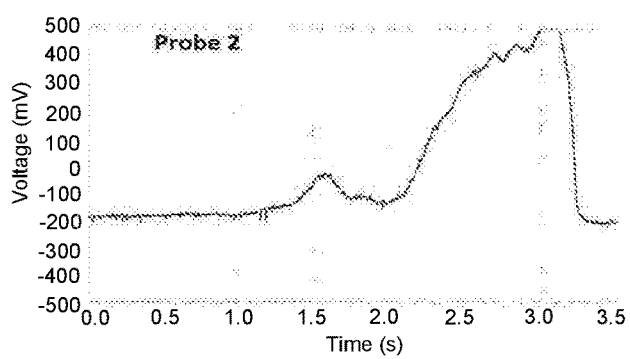
Figure 8C:
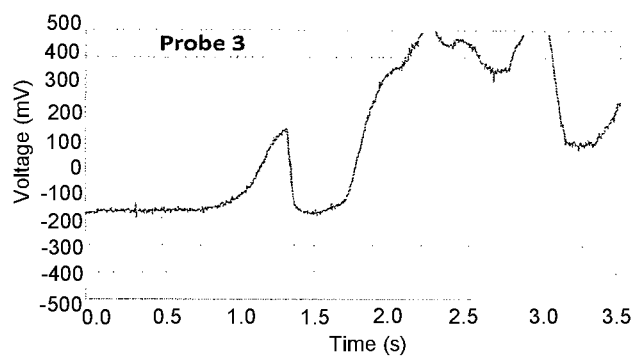
Figure 8D:
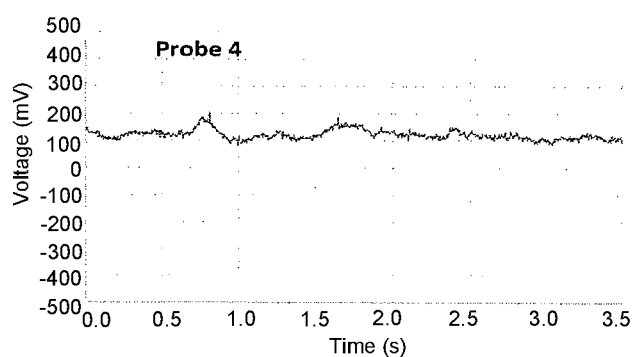
Figure 8E:
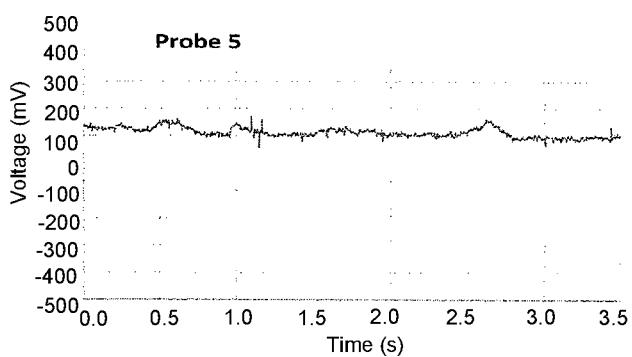
Figure 8F:
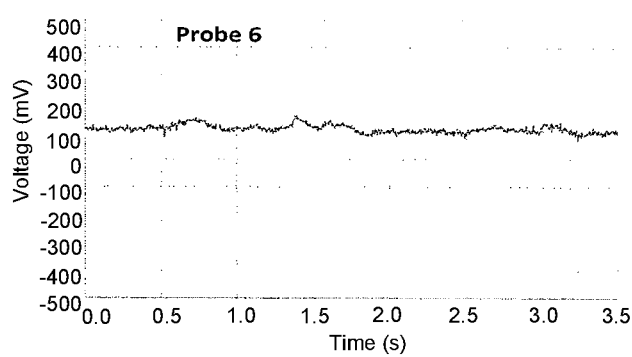

FIGS. 8A-8E are example resistivity plots, each corresponding to a sensor probe position, where the resistivity is given as a function of voltage (mV). It can be seen that the resistivity varies significantly over time in the plots of FIGS. 8A, 8B and 8C, corresponding to the top three probes at the top levels of the tank as represented by the plot shown in FIG. 7, whereas the resistivity as a function of voltage (mV) measured at probes 4, 5 and 6, as shown at FIGS. 8D, 8E and 8F, is relatively consistent, thereby indicating that those probes are below the top of the liquid level.

Figure 9:
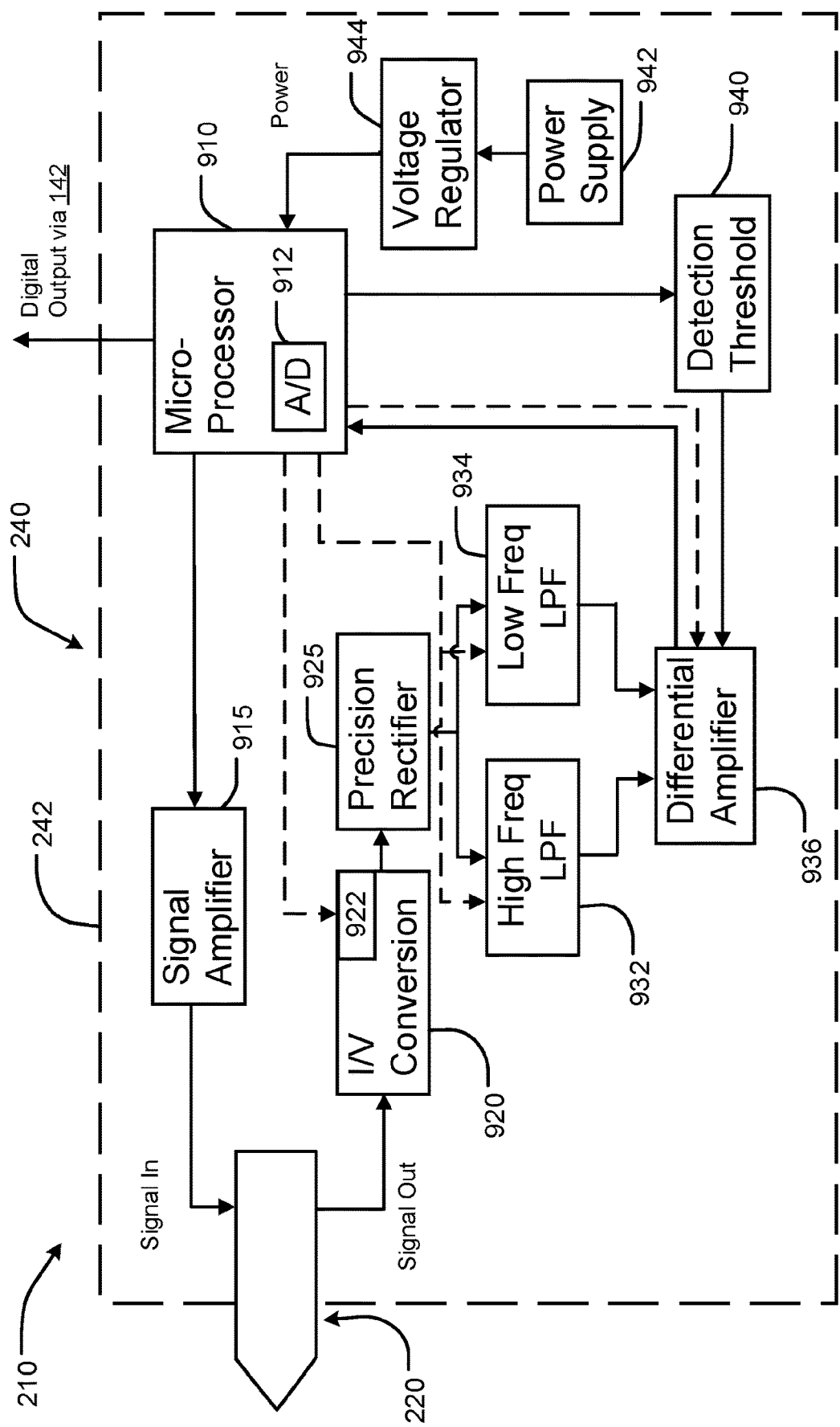
FIG. 9 is a block diagram to illustrate example sensor probe circuitry.

Referring now to FIG. 9, the electronic circuitry of the sensor probes 210 is shown in further detail. Probe circuitry 240 comprises a microprocessor 910 that receives power from a power supply 942 via a voltage regulator 944. Microprocessor 910 either supplies power to other circuits within probe circuitry 240 or controls the supply of power from power supply 942 to the other circuits.

Microprocessor 910 comprises an analog-to-digital conversion (ADC) circuit or functional unit 912, and provides a digital output to processor 130 via bus 142. Alternatively, a separate ADC circuit can be used instead of the one integrated within microprocessor 910.

Microprocessor 910 provides a driver signal to amplifier circuit 915, which amplifies the driver signal and provides it as an input signal to the probe body 220 (to either the core electrode 521 or the outer electrode 523). As liquids and/or bubbles pass the probe tip 525, the input signal is varied. The other of the two electrodes of the probe body 220 then provides an output signal that varies depending on changes in conductivity across the probe body tip 525 over time due to the liquid and/or bubbles passing. This output signal is received at a current to voltage conversion circuit 920, the output of which is provided to precision rectifier 925 circuitry. The precision rectifier 925 provides the rectified signal to a high frequency low pass filter (HFLPF) circuit 932 and a low frequency LPF (LFLPF) circuit 934, the outputs of each of which are then fed into a differential amplifier circuit 936 for comparison. The HFLPF circuit 932 has a significantly shorter (e.g. by two or more orders of magnitude) time constant than the LFLPF circuit 934 and filters out signals greater than a high frequency threshold, which may be in the order of 2 kHz, for example. The LFLPF circuit 934 filters out signals less than a low frequency threshold, which may be in the order of 5 Hz, for example. The LFLPF circuit 934 may have a time constant in the order of 3 seconds, while the time constant of the HFLPF circuit 932 may have a time constant that is near-instantaneous.

The differential amplifier circuit 936 acts as a comparator circuit, receiving a detection threshold input from a detection threshold circuit 940 that is used by the differential amplifier circuit 936 to determine if the signal received from the probe body 220 is above a selected detection threshold and therefore warrants output to the microprocessor 910 indicative of the presence of or passing of a bubble past the sensor tip 525. If the differenced (compared) output from the two input circuits (HFLPF circuit 932 and the LFLPF circuit 934) is not above the detection threshold, then either a low signal is provided to the microprocessor 910 as output from the differential amplifier circuit 936 or no signal is provided. The detection threshold is configurable based on a configuration output signal from the microprocessor 910 to the detection threshold circuit 940.

A bubble is determined to be present at the probe tip based on amplitude changes in the sensed current at the probe tip 525 over time. Current amplitude changes occur at the leading edge of the bubble and the trailing edge of the bubble, with the time between the sensed amplitude changes providing an indication of the size of the bubble or the speed of passage of the bubble across the tip sensor surfaces. The bubbles are counted using a software counter function executed by the microprocessor 910 once the signal (received from probe tip 525 and processed through the precision rectifier circuit 925) is above a detection threshold (specified by detection threshold circuit 940) for a set amount of time (that is configurable via the microprocessor 910) for each individual probe 210. The void is calculated by the time difference between when the signal from the probe tip 525 passes above and then below the detection threshold for a set amount of time (that is configurable in the processor) for each individual probe.

In some embodiments, the time constant of the HFLPF circuit 932 and the LFLPF circuit 934 can be varied in response to a control signal from the microprocessor 910 in order to tune the filter ranges. Additionally, the current to voltage conversion circuit 920 can be adjustable by the microprocessor 910, for example by applying a signal from the microprocessor 910 to vary a variable resistor value within the current to voltage conversion circuit 920. This adjustment may be configured to be done automatically by the microprocessor 910 in response to the ADC 912 input reaching a certain input limit. This automatic scaling of the current to voltage conversion circuit 920 helps to keep the input voltage to the other circuitry below a saturation value, for example. The current to voltage conversion circuit 920 in the probe circuitry 240 for each of the probes 210 can be automatically scaled independently of the others by the microprocessor 910 in the respective probe circuitry 240. In this way, some of the probe circuits 240 may employ different voltage scaling to other probe circuits.

The signals supplied to and received from the probe body 220 can be used in various ways to determine (by processor 130) one or more process parameters, such as froth-related parameters, that provide useful information about the process and allow the process to be controlled to become more efficient or to provide better mineral processing yield.

In some embodiments of sensor probe 210, the microprocessor 910 is omitted from the sensor circuitry 240 and the microprocessor functions described above are instead provided by one or more processors within processor 130 or by processor 130 in combination with additional local circuitry within sensor circuitry 240.

The probe circuitry 240 for each sensor probe 210 is preferably enclosed within an electromagnetic (EM) noise shield, such as a kind of Faraday cage, to shield the sensor circuitry from noise emanating from other nearby sources. Additionally, the sensor circuitry 240 may be embedded or encased within a sealing substance, such as a resin, to shield it from ingress of liquids, dust or other environmental pollutants.

Figure 10:
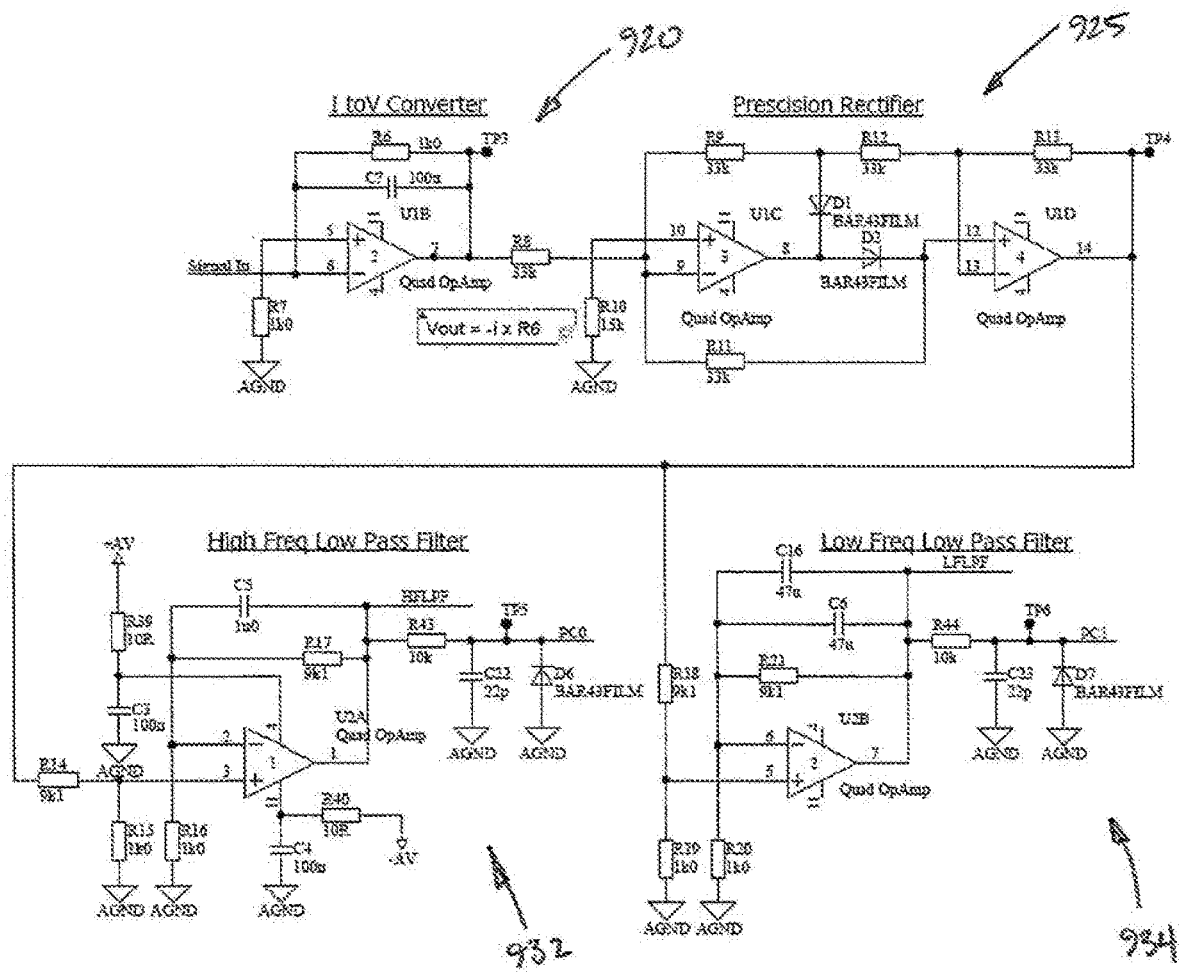
FIG. 10 is a schematic circuit diagram of an output part of the sensor probe circuitry.
Figures 11, 12:
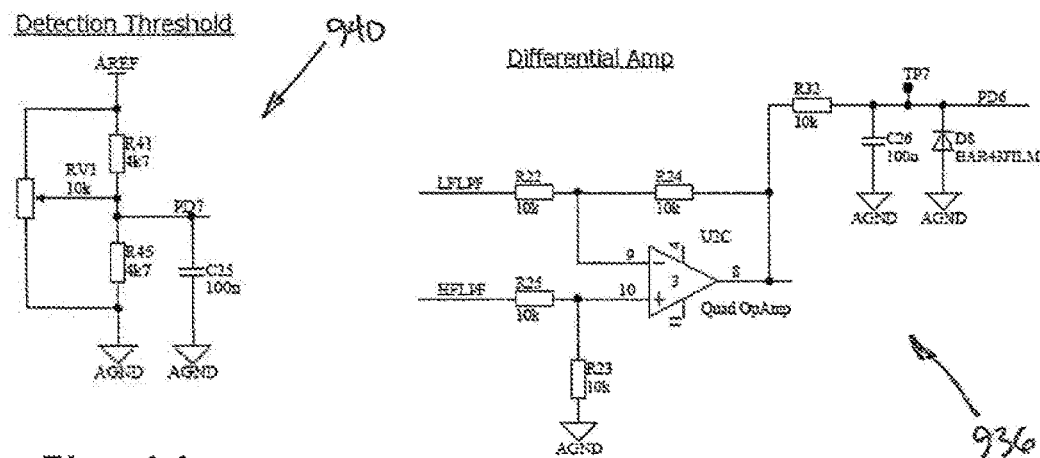
FIG. 11 is a schematic circuit diagram of a threshold detection circuit.
FIG. 12 is a schematic circuit diagram of a differential amplifier.
Figure 13:
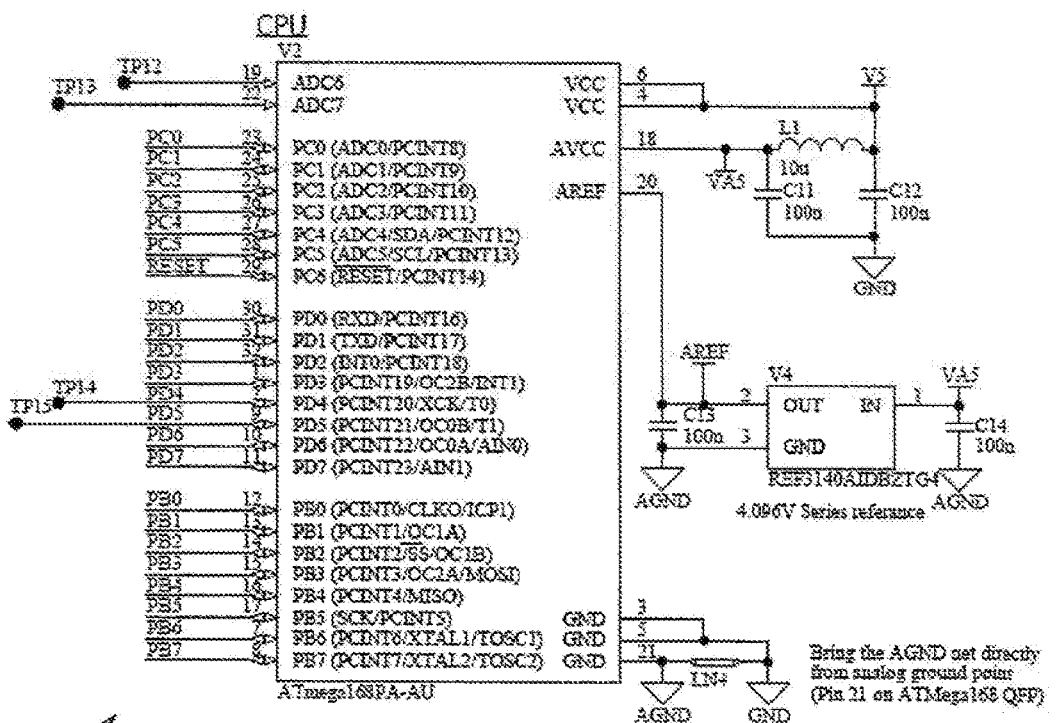
FIG. 13 is a schematic circuit diagram of a microcontroller.
Figure 14:
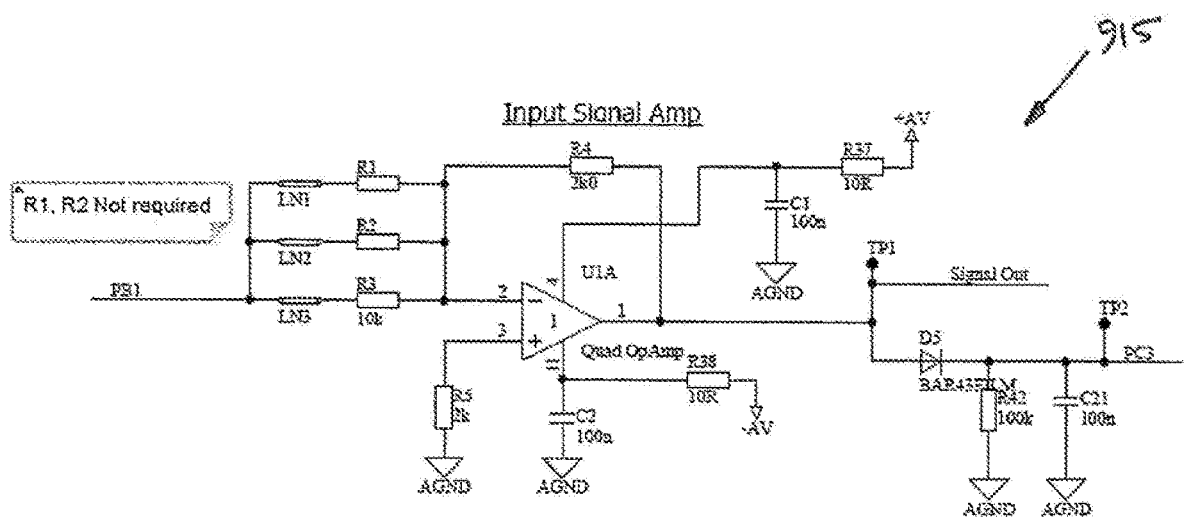
FIG. 14 is a schematic circuit diagram of an input signal amplifier.

FIGS. 10 to 22 are electrical circuit diagrams or schematics to illustrate functionality of the probe circuitry 240 as described above and shown generally in FIG. 9. FIG. 10 illustrates the current to voltage converter circuitry 920, the precision rectifier circuitry 925, the HFLPF circuit 932 and the LFLPF circuit 934. FIG. 11 illustrates the threshold detection circuit 940. FIG. 12 illustrates the differential amplifier (comparator) circuitry 936. FIG. 13 illustrates an example microprocessor 910, which may be an ATmega168PA-AU chip sold by Atmel, for example. FIG. 14 illustrates signal amplifier circuit 915. FIG. 15 illustrates an example voltage regulator circuit 944. FIG. 16 illustrates an example 5 volt power supply 942. FIG. 17 illustrates an example chip programming interface. FIG. 18 illustrates an example three-colour LED circuit for each LED light 152 of the status display 150. FIG. 19 illustrates an example electrical representation of the probe body 220. FIG. 20 illustrates an example 12C bus interface. FIG. 21 illustrates an example serial interface. FIG. 22 illustrates an example clock circuit for the probe circuitry 240.

Output signals from the probe body 220 may be scaled when received by the current to voltage conversion circuit 920 to reduce the likelihood of an input voltage to the ADC 912 reaching a certain input limit, and to compensate for variations in the output signals received from the probe body 220. The processor 130 of sensor system 200 may be configured to control each of the microprocessors 910 to scale the output signal from its associated probe body 220 by varying the value of the variable resistor 922, based on the measured output of one sensor probe 210 in the sensor array 140.

In some embodiments, the processor 130 of sensor system 200 is configured to periodically signal each of the microprocessors 910 to measure the output signal from the probe body 220 without scaling by means of the variable resistor 922, in order to determine which of the probes 210 has the highest output signal, typically to determine which probe has the highest instantaneous conductivity measurement. The probe with the highest output signal from the probe body 220 becomes a reference probe $P_N$. The frequency or time interval at which the probe 210 with the highest output signal is identified is predetermined (for example, set at processor 130, optionally in response to a set command from DCS 255 or server system 260). This frequency or time interval may be selectively varied, and may, for example, be selected to cause the processor 130 to recalibrate the probe array 140 every 30, 45, 60, 75, 90, 105, 120 or 180 seconds, for example. Alternatively, one specific probe 210, such as the lower most probe 210 (disposed deepest in the pulp), in the sensor array 140 may be designated as the reference probe $P_N$.

The variable resistor 922 of the sensor probe 210 ($P_N$) identified to have the highest output signal may be adjusted (by a control signal from microprocessor 910) so that the scaled output signal from the probe body 220 is at a predetermined proportion, such as a proportion between about 60% and 95%, or optionally, about 75%, of the maximum measured value. The adjusted resistance value of the variable resistor 922 for the sensor probe 210 ($P_N$) with the highest output signal may then be used in order to scale each of the output signals from each probe body within the sensor array 140. For this purpose, processor 130 instructs the microprocessors 910 of the various other probes 210 to generate and send control signals to set the value of the variable resistor to the resistance value that corresponds to the predetermined proportion of the maximum measured conductivity value.

In some embodiments, the probe circuitry 240 is configured to measure additional probe characteristics, including capacitance. The probe circuitry 240 may be configured to automatically switch between utilising each of the probe characteristics such as conductivity and capacitance based on the measured values, in order to establish froth parameters. The conductivity measurements may be conducted substantially utilizing the methods described above. Capacitance of the probe body 220 may be measured by supplying the probe body 220 with a constant current and measuring the time taken for the capacitive load to reach a predetermined charged threshold.

For example, when measuring the output signal from the probe body 220 to monitor conductivity, the variable resistor 922 is adjusted in an attempt to scale the magnitude of the output signal received from the probe body 220. However, if the variable resistor 922 is varied to an upper or lower extremity, and the output signal from the probe body 220 is not within the required range, the microprocessor 910 automatically switches over from a conductivity-sensing mode to a capacitance-sensing mode to measure the capacitance of the probe body 220, and monitor changes in capacitance to determine the froth parameters.

In some embodiments, the capacitance of the probe body 220 is measured utilizing a capacitive sensing function and associated circuitry integrated within microprocessor 910. For example, with reference to FIG. 28, probe body 220 may be connected to pin 14 (marked CAPSENSE) of microprocessor 910 by an electrical signal conductor. The microprocessor 910 is configured to measure capacitance by means of an internal analog to digital converter, utilizing similar methods used in touch screen applications, for example.

Typical values of conductivity measurements may be between about 5 micro Siemens and about 20 milli Siemens, for example.

Figure 23:
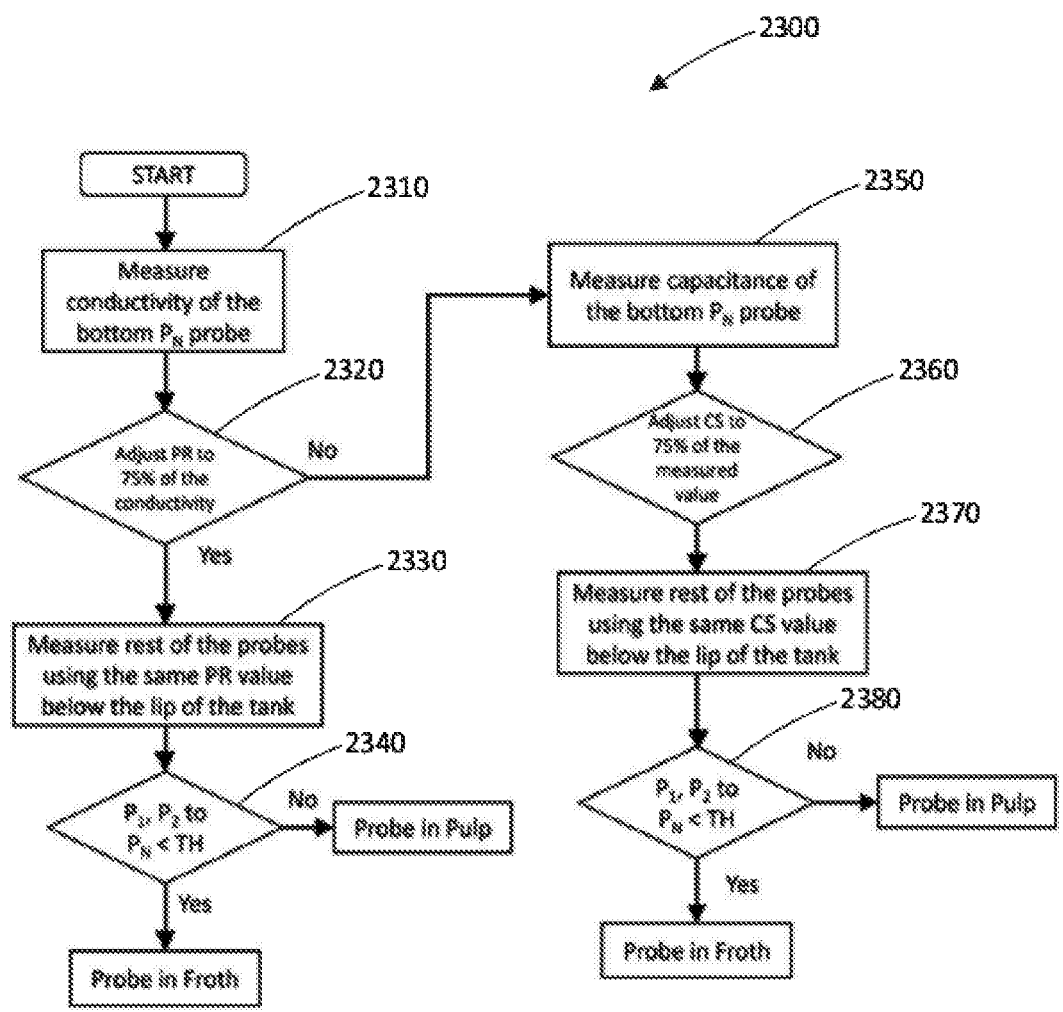
FIG. 23 is a flow diagram of a method for operating a sensor probe array.

FIG. 23 shows a process flow diagram of a process or method 2300 for establishing the probe characteristic (and sensing mode)—conductivity or capacitance—to be used in determining froth parameters based on the output signal from the probe body 220. The process 2300 is initiated at 2310 by determining (by processor 130 of the main control unit) the sensor probe 210 to be used as the reference probe $P_N$ in accordance with the process set out above. At 2320, the output signal from the probe body 220 of probe $P_N$ is caused by microprocessor 910 to be scaled to the predetermine proportion, such as 75%, in order to allow for variations in output signals. At 2320, the microprocessor 910 (or optionally processor 130) firstly determines whether the signal successfully scaled to 75% of maximum and secondly whether or not the scaled value produces a measureable output signal for the ADC. If yes to both, then at 2330 the processor 130 causes all the sensor probes 210 in the sensor array 140 to be adjusted to use the same variable resistor 922 value, and the conductivity of each probe 210 is measured.

At 2340, until the next time at which the predetermined proportion is re-calibrated (e.g. a minute or so later), each of the measured conductivity values for each of the sensor probes 210 is compared to a threshold value. If the conductivity is less than the threshold, then the probe position of the probe is determined to be in the froth. If the measured conductivity is equal to or greater than the threshold, then the probe is determined to be positioned in the pulp. Based on which sensor probes 210 are determined to be in the pulp or the froth, the vertical level of the froth in the flotation cell 110 can be determined to within a margin corresponding to the vertical separation of the tips of the adjacent sensor probes 210.

At 2320, if scaling of the output signal from the probe body 220 could not be successfully achieved, or a measurable output signal from the probe body could not be obtained, then, at 2350 the processor 130 communicates with microprocessors 910 to measure the capacitance of all the sensor probes 210 to determine the specific reference probe $P_N$ with the greatest measured capacitance. At 2360, the output signal from the probe $P_N$ is scaled to a predetermined capacitance proportion, such as 60% to 95% or optionally 75%, of the measured maximum capacitance value by adjusting capacitance sensitivity within the microprocessor 910. At 2370, the microprocessors 910 of the other sensor probes 210 in the sensor array 140 are adjusted to use the same capacitance sensitivity as the reference probe $P_N$. At 2380, each of the measured capacitances for sensor probes 210 are compared by respective processors 910 to a predetermined capacitance threshold value. If the capacitance threshold value is equalled or exceeded, the probe is determined by the microprocessor 910 to be in the pulp, otherwise the probe 210 is determined by microprocessor 910 to be positioned in the froth.

Figure 24:
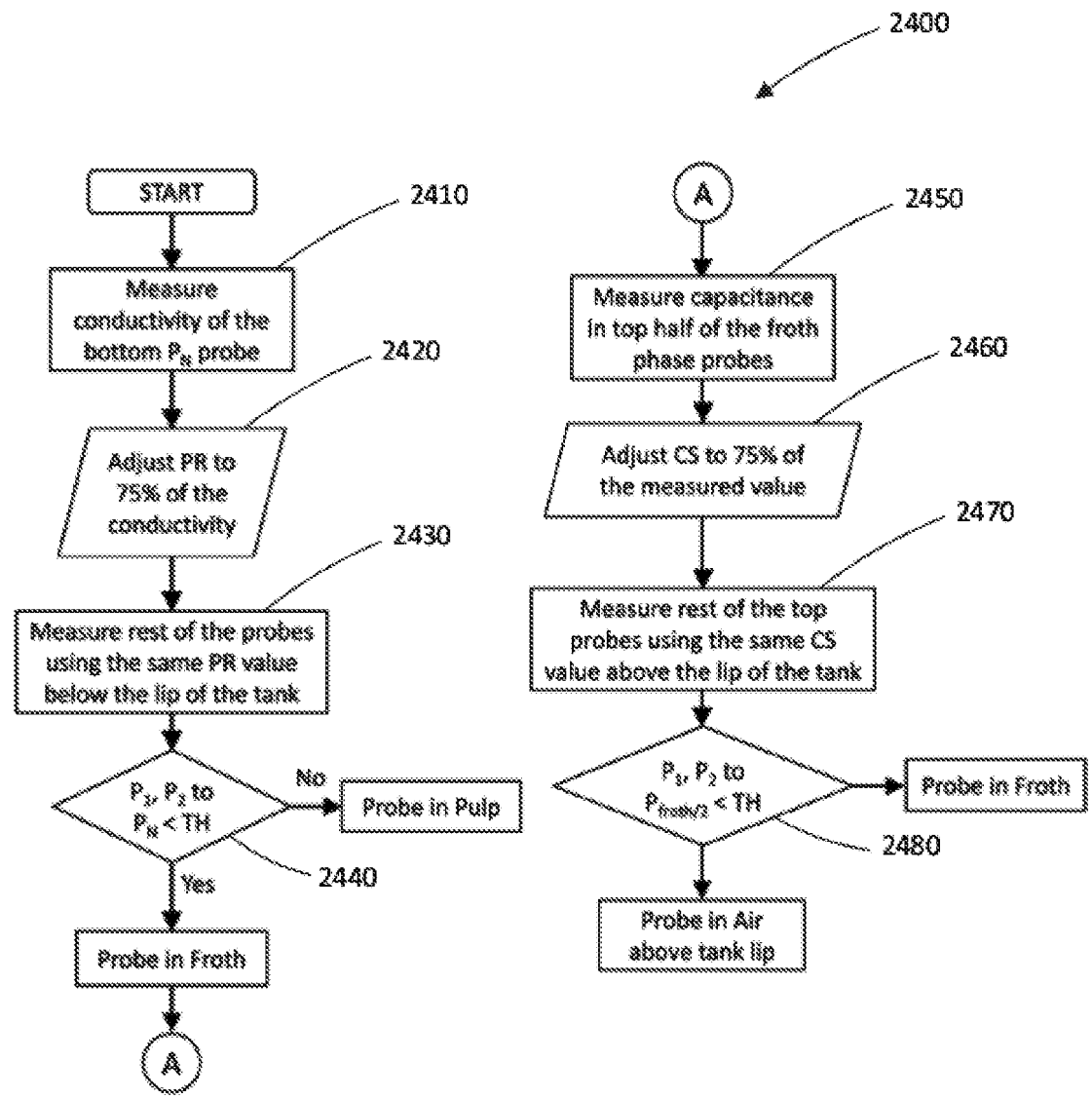
FIG. 24 is a flow diagram of an alternative method for operating a sensor probe array.

FIG. 24 shows a process flow diagram for a process or method 2400 of determining whether a probe 210 is located in the pulp, in the froth or in open air above the tank lip. At 2410, the process 2400 is initiated by measuring the instantaneous conductivity of the sensor probes 210 in the sensor array 140 to determine which of the sensors probes 210 is to be the reference probe $P_N$. At 2420, the programmable resistor 922 of reference probe $P_N$ is adjusted until the output signal from the probe body 220 is 75% of the reference output signal. At 2430, the processor 130 instructs the microprocessor 910 of each probe 210 to adjust the variable resistor 922 to the same value as the variable resistor value of the reference probe $P_N$, and to measure the conductivity at the tip of each probe body 220. At 2440, the measured conductivity at each probe 210 is compared to a threshold value. If the measured conductivity at a particular probe 210 is determined by the microprocessor 910 (or optionally the processor 130) to be equal to or greater than the threshold value, then the probe 210 is determined to be located in the pulp. If the measured conductivity at a particular probe 210 is determined by the microprocessor 910 (or optionally the processor 130) to be lower than the threshold value, then the probe 210 is determined to be in the froth.

At 2450, once the probes 210 that have tips that are positioned within the froth have been identified, a capacitance on a top group of the probes within the froth is measured in order to establish which probes are located in the air above a tank lip. At 2460, the maximum measured capacitance of the top group of the probes located within the froth is determined to establish a capacitance reference probe $P_N$ for the probes 210 within the froth. The capacitance sensitivity for the top group of the probes is adjusted by means of the microprocessor 910 to a predetermined proportion or ratio, for example of about 75%, of the capacitance sensitivity of the reference probe $P_N$. At step 2470, the adjusted capacitance of each of the top half of the probes 210 positioned within the froth is compared to a threshold value, if the capacitance is determined to be equal to or greater than the threshold value, the probe is located within the froth. If the capacitance is less than the threshold value, the probe is determined to be located within air above the tank.

Figure 25:
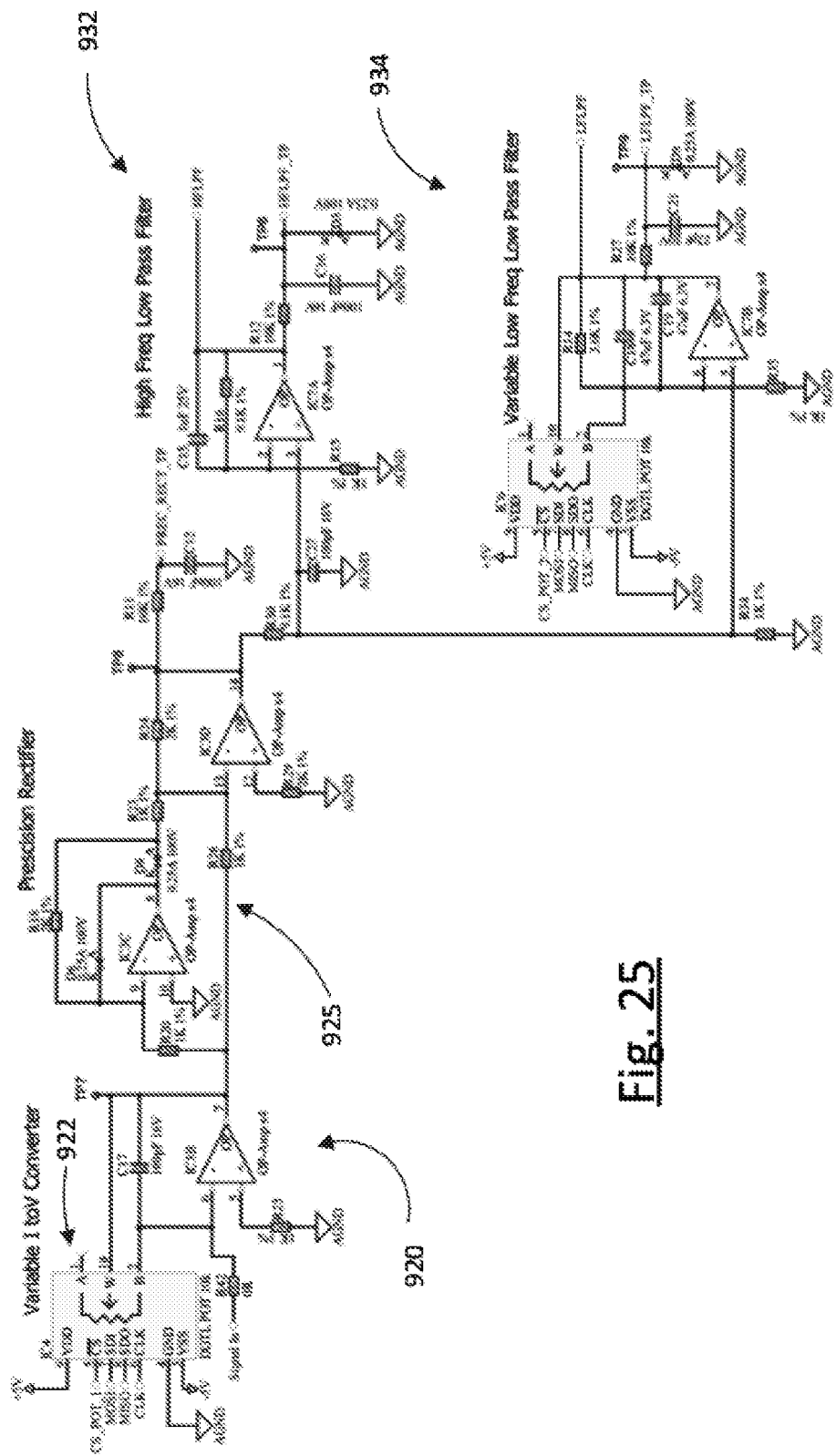
FIG. 25 is a schematic circuit diagram of an output part of the sensor probe circuitry.
Figure 27:
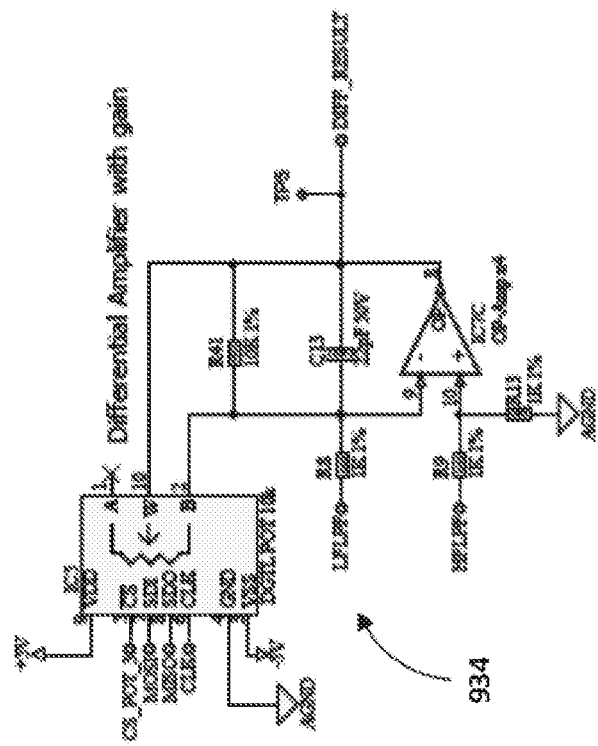
FIG. 27 is a schematic circuit diagram of a differential amplifier.
Figure 26:
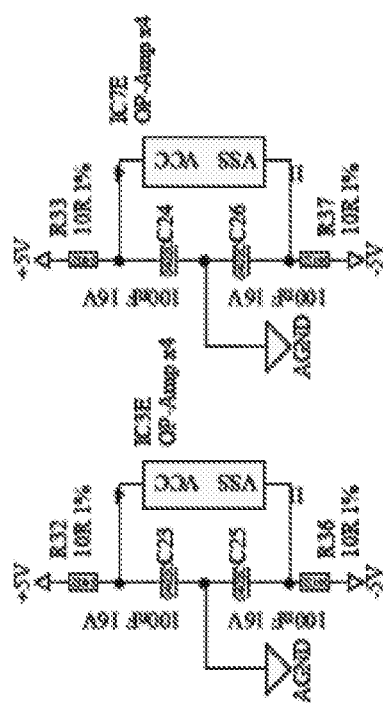
FIG. 26 is a schematic circuit diagram of an op-amp stability circuit.
Figure 28:
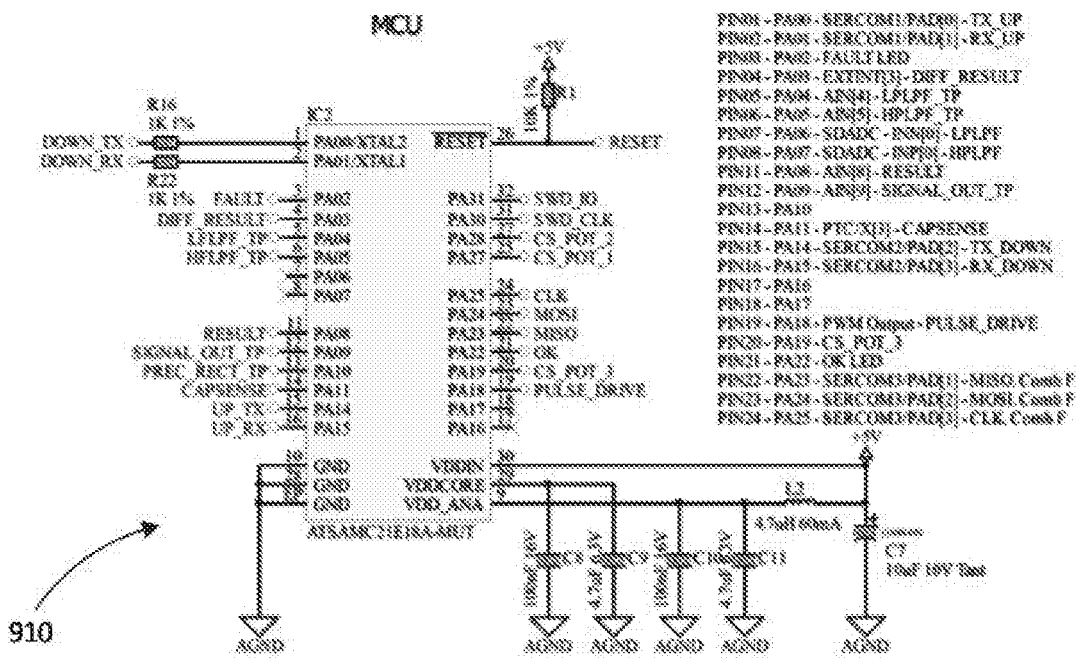
FIG. 28 is a schematic circuit diagram of a microcontroller of a sensor probe.
Figure 29:
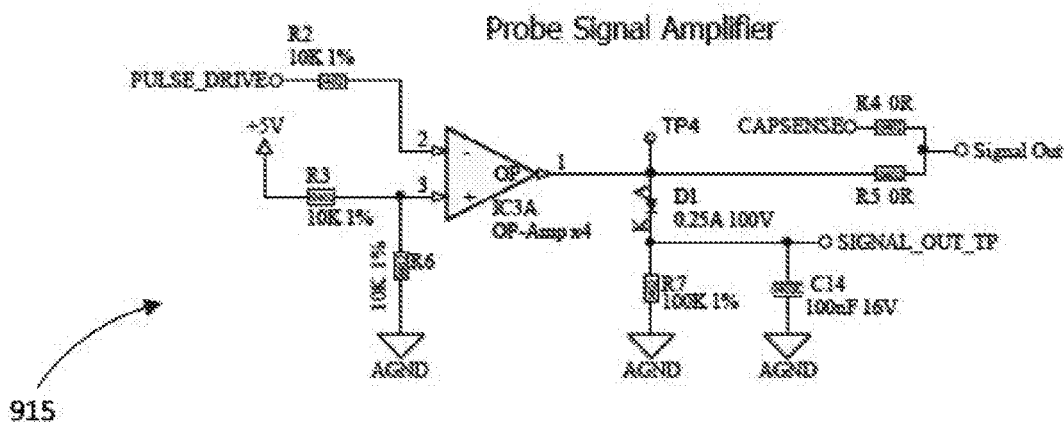
FIG. 29 is a schematic circuit diagram of a probe signal amplifier.
Figures 30, 31:
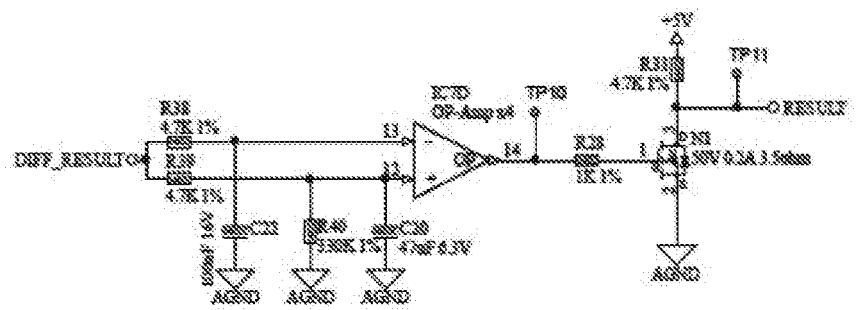
FIG. 30 is a schematic circuit diagram of an op-amp circuit for receiving a signal from the differential amplifier.
FIG. 31 is a schematic circuit diagram of a voltage regulator.
Figure 32:
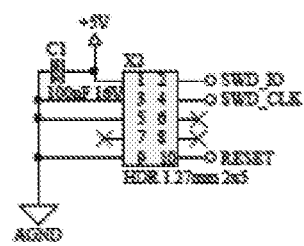
FIG. 32 is a schematic circuit diagram of a programming socket.
Figure 33:
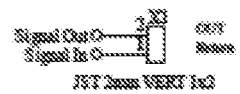
FIG. 33 is a schematic circuit diagram of a probe.
Figure 34:
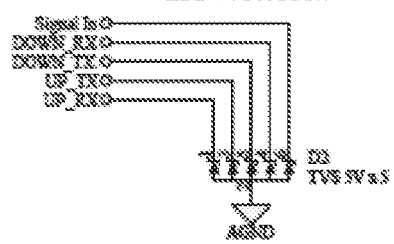
FIG. 34 is a schematic circuit diagram of a electrostatic discharge protection circuit.
Figure 35:
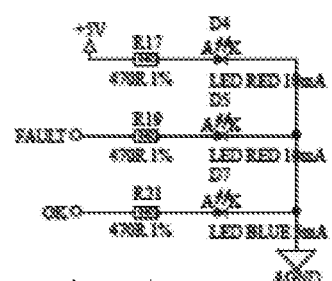
FIG. 35 is a schematic circuit diagram of a light emitting diode (LED) circuit.
Figure 36:
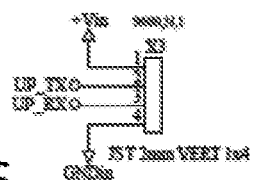
FIG. 36 is a schematic circuit diagram of a serial uplink.
Figure 37:
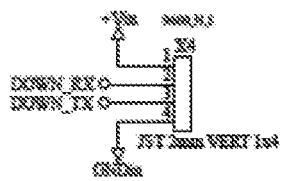
FIG. 37 is a schematic circuit diagram of a serial downlink.
Figure 38:
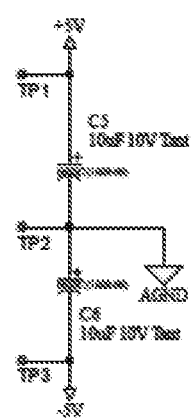
FIG. 38 is a schematic circuit diagram of a voltage divider.
Figure 39:
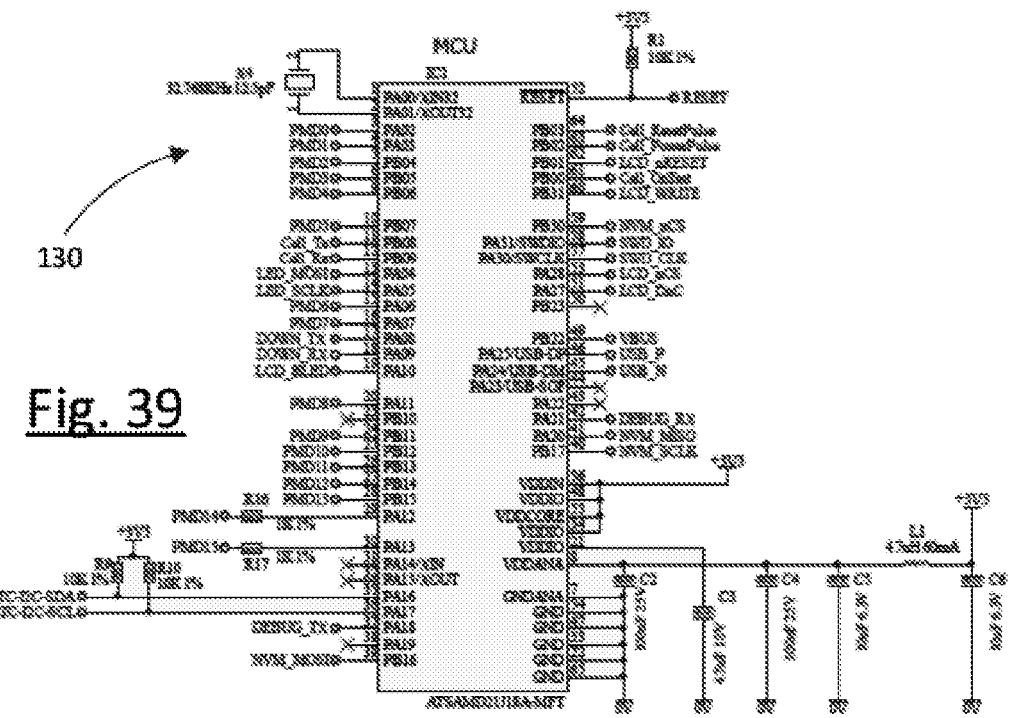
FIG. 39 is a schematic circuit diagram of a microcontroller of a main control unit.
Figure 40:
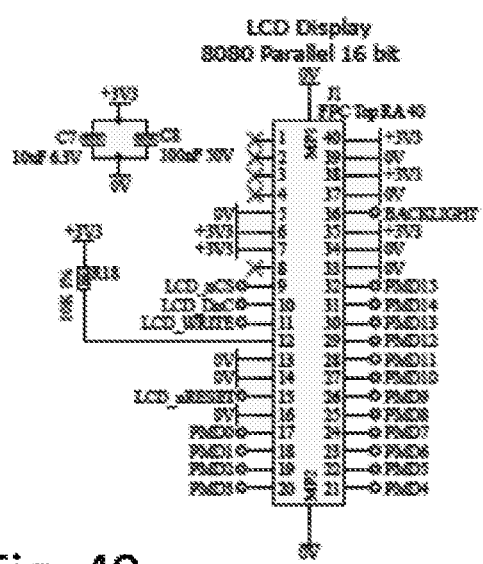
FIG. 40 is a schematic circuit diagram of a liquid crystal display (LCD) display interface.
Figure 41:
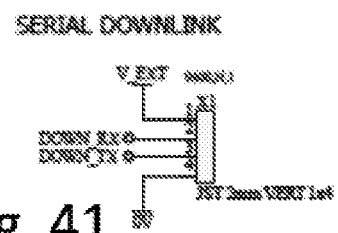
FIG. 41 is a schematic circuit diagram of a serial downlink interface.
Figure 42:
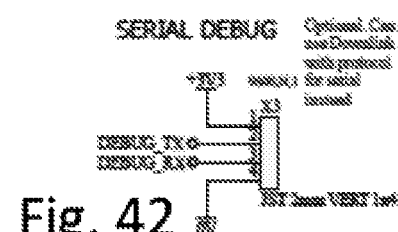
FIG. 42 is a schematic circuit diagram of a serial debug interface.
Figure 43:
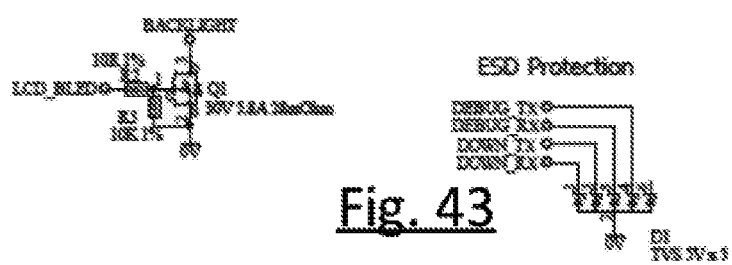
FIG. 43 is a schematic circuit diagram of an electrostatic discharge protection circuit.
Figure 47:
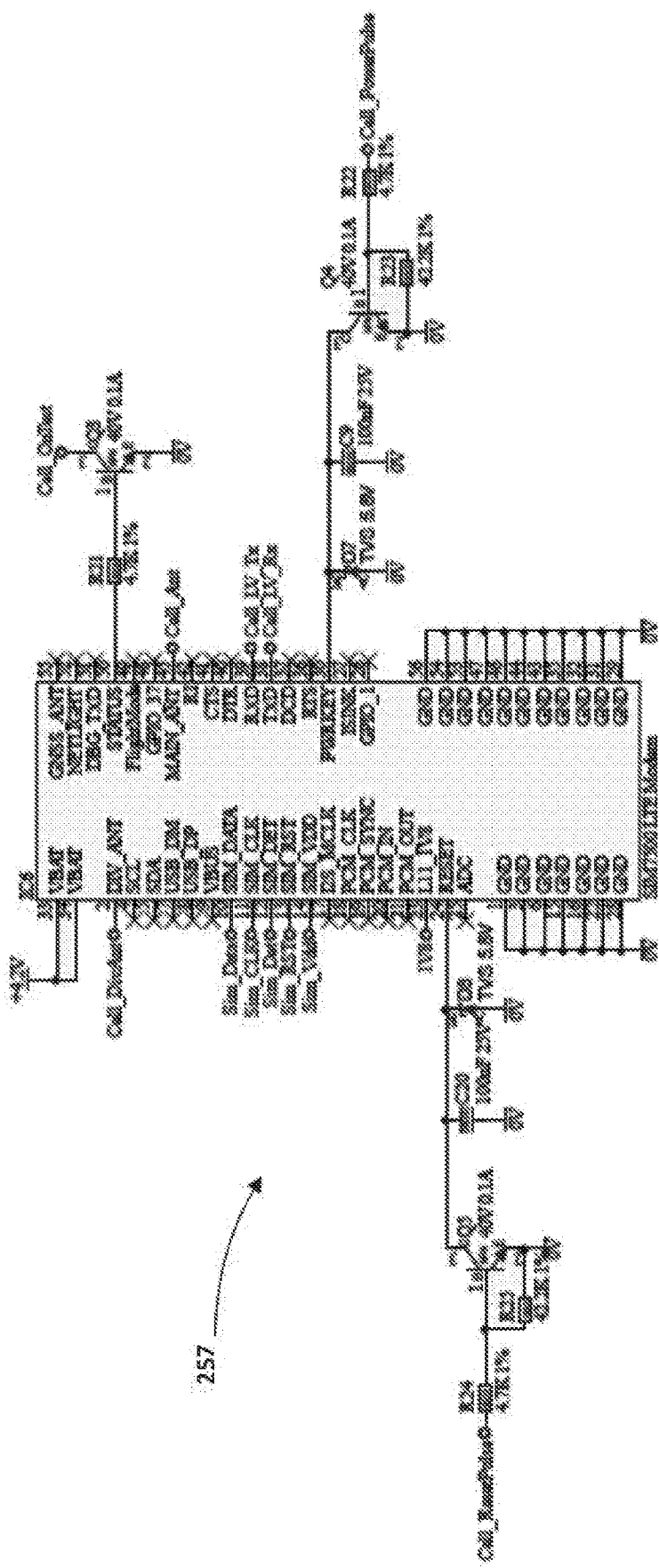
Figure 49:
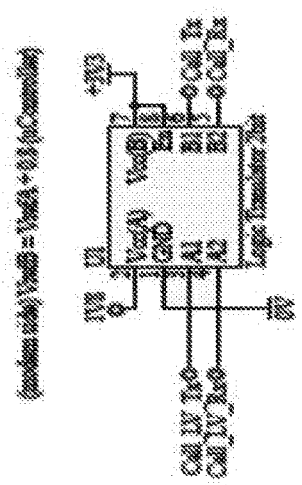

FIGS. 25 to 38 are electrical circuit diagrams or schematics of some further embodiments to illustrate further functionality of the probe circuitry 240 as described above and shown generally in FIG. 9. FIG. 25 illustrates example current to voltage converter circuitry 920 (including the variable resistor 922), example precision rectifier circuitry 925, an example HFLPF circuit 932 and an example LFLPF circuit 934. FIG. 26 illustrates an example threshold detection circuit 940. FIG. 27 illustrates an example operational amplifier circuit. FIG. 28 illustrates an example microprocessor 910, which may be an ATSAMC21E18A-MUT chip, for example. FIG. 29 illustrates an example signal amplifier circuit 915. FIG. 31 illustrates an example voltage regulator circuit 944. FIG. 44 illustrates an example 5 volt power supply 942. FIG. 32 illustrates an example chip programming interface. FIG. 35 illustrates an example three-colour LED circuit for each LED light 152 of the status display 150. FIG. 33 illustrates an example electrical representation of the probe body 220. FIGS. 36 and 37 illustrate example serial interfaces.

FIGS. 39 to 46 are electrical circuit diagrams or schematics to illustrate the functionality of processor 130 circuitry according to some embodiments.

FIGS. 47 to 51 are electrical circuit diagrams or schematics to illustrate the functionality of a wireless communication subsystem that may be employed as part of system 200 to facilitate communication with remote devices.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. Froth measurement apparatus, comprising:
an elongate first housing portion;
a series of sensor probes positioned along the first housing portion, each of the sensor probes having a probe body extending away from the first housing portion by a distance and comprising first and second electrodes for measuring changes in electrical potential associated with froth and/or bubbles, the first and second electrodes being electrically insulated from each other, wherein a first sensing surface at a distal end of the first electrode is spaced from a second sensing surface at a distal end of the second electrode, wherein each sensor probe comprises respective signal processing circuitry coupled to each probe body to receive an analog output signal from each respective probe body and to generate a digital output signal based on the respective analog output signal; and
at least one processor configured to receive the digital output signals or sensor information of the series of sensor probes based on the digital output signals and configured to determine at least one froth parameter over a sampling period based on the digital output signals or the sensor information;
wherein the at least one froth parameter comprises a measured bubble size and/or a measured bubble quantity.

2. The apparatus of claim 1, wherein the probe bodies extend away from the housing by a distance of 10 mm to 100 mm.

3. The apparatus of claim 2, wherein the distance is 30 mm to 70 mm.

4. The apparatus of claim 1, wherein the first housing portion is elongate in a vertical direction and houses the signal processing circuitry in a sealed chamber.

5. The apparatus of claim 1, wherein the first and second electrodes are co-axial along a longitudinal axis of the sensor probe.

6. The apparatus of claim 1, wherein the first and second electrodes are concentric.

7. The apparatus of claim 1, wherein the first and second electrodes are separated by an insulating material that is concentric with the first and second electrodes.

8. The apparatus of claim 1, wherein the signal processing circuitry comprises an ADC unit to generate digital output signals based on analog output signals from the respective probe body.

9. The apparatus of claim 8, wherein each of the ADC units is housed within the first housing portion.

10. The apparatus of claim 1, wherein the at least one processor is disposed outside of the first housing portion.

11. The apparatus of claim 1, further comprising a second housing portion that is separate from the first housing portion and that houses the at least one processor.

12. The apparatus of claim 1, wherein each of the probe bodies extends downwardly at an acute angle to the horizontal.

13. The apparatus of claim 1, further comprising electromagnetic shielding to shield the signal processing circuitry from environmental signal interference.

14. The apparatus of claim 1, wherein the series of sensor probes is arranged in a substantially linear array.

15. The apparatus of claim 14, wherein the linear array of sensor probes comprises a staggered linear array.

16. The apparatus of claim 1, wherein the first housing portion is disposed in a flotation cell chamber to measure froth during operation of a flotation cell.

17. The apparatus of claim 16, wherein the at least one processor is configured to generate a process command based on the determined bubble size and bubble quantity and to communicate the process command to process equipment associated with the flotation cell to alter a process input to the flotation cell.

18. The apparatus of claim 1 wherein the signal processing circuitry comprises a current to voltage converter for converting the analog output signal from the probe body to a signal suitable as input to a precision rectifier circuit.

19. The apparatus of claim 18, wherein the current to voltage converter comprises a variable resistor that can be controlled by the processer in order to scale the analog output signals from the probe body.

20. The apparatus of claim 1, wherein the signal processing circuitry is configured to switch between a conductivity-sensing mode and a capacitance-sensing mode based on the digital output signals or the sensor information.

21. A system comprising the froth measurement apparatus of claim 1, further comprising a computing system in communication with the at least one processor to monitor an output of the froth measurement apparatus.

22. A method of monitoring a process using a froth measurement apparatus, the froth measurement apparatus, comprising:
an elongate first housing portion;
a series of sensor probes positioned along the first housing portion, each of the sensor probes having a probe body extending away from the first housing portion by a distance and comprising first and second electrodes for measuring changes in electrical potential associated with froth and/or bubbles, the first and second electrodes being electrically insulated from each other, wherein a first sensing surface at a distal end of the first electrode is spaced from a second sensing surface at a distal end of the second electrode, wherein each sensor probe comprises respective signal processing circuitry coupled to each probe body to receive an analog output signal from each respective probe body and to generate a digital output signal based on the respective analog output signal; and
at least one processor configured to receive the digital output signals or sensor information of the series of sensor probes based on the digital output signals and configured to determine at least one froth parameter over a sampling period based on the digital output signals or the sensor information, the method comprising:
determining the at least one froth parameter;
determining a modified process parameter based on the at least one froth parameter; and
applying the modified process parameter to the process;
wherein the at least one froth parameter comprises a measured bubble size and/or a measured bubble quantity.

* * * * *